United States Patent
Sridhar et al.

(10) Patent No.: US 10,891,162 B2
(45) Date of Patent: Jan. 12, 2021

(54) METHODS AND APPARATUS TO IMPROVE EXTERNAL RESOURCE ALLOCATION FOR HYPER-CONVERGED INFRASTRUCTURES BASED ON COSTS ANALYSIS

(71) Applicant: VMware Inc., Palo Alto, CA (US)

(72) Inventors: Thayumanavan Sridhar, Sunnyvale, CA (US); Raja Kommula, Cupertino, CA (US); Rajesh Agarwalla, Palo Alto, CA (US)

(73) Assignee: VMWARE, INC, Palo Alto, CA (US)

( * ) Notice: Subject to any disclaimer, the term of this patent is extended or adjusted under 35 U.S.C. 154(b) by 347 days.

(21) Appl. No.: 15/880,178

(22) Filed: Jan. 25, 2018

(65) Prior Publication Data

US 2019/0227845 A1     Jul. 25, 2019

(51) Int. Cl.
*G06F 9/50*     (2006.01)
*G06F 3/06*     (2006.01)
*G06F 9/455*     (2018.01)

(52) U.S. Cl.
CPC .......... *G06F 9/5016* (2013.01); *G06F 3/0605* (2013.01); *G06F 3/067* (2013.01); *G06F 3/0608* (2013.01); *G06F 3/0631* (2013.01); *G06F 3/0653* (2013.01); *G06F 9/45558* (2013.01); *G06F 9/5044* (2013.01); *G06F 9/5077* (2013.01); *G06F 3/0604* (2013.01); *G06F 2009/45583* (2013.01)

(58) Field of Classification Search
CPC ......... G06F 2009/45583; G06F 3/0604; G06F 3/0605; G06F 3/0608; G06F 3/0631; G06F 3/0653; G06F 3/067; G06F 9/45558; G06F 9/5016; G06F 9/5044; G06F 9/5077
See application file for complete search history.

(56) References Cited

U.S. PATENT DOCUMENTS

| | | | |
|---|---|---|---|
| 6,968,323 B1* | 11/2005 | Bansal | G06Q 10/06 705/80 |
| 9,830,082 B1* | 11/2017 | Srinivasan | G06F 3/061 |
| 10,108,560 B1* | 10/2018 | Lamb | G06F 3/0607 |
| 10,318,166 B1* | 6/2019 | Tummala | G06F 3/0631 |
| 2005/0278441 A1* | 12/2005 | Bond | G06F 9/5027 709/223 |
| 2014/0047227 A1* | 2/2014 | Breternitz | G06F 9/5066 713/2 |
| 2014/0267561 A1* | 9/2014 | Ahuja | H04N 7/15 348/14.08 |
| 2018/0239556 A1* | 8/2018 | Cao | G06F 3/0608 |

\* cited by examiner

*Primary Examiner* — Jorge A Chu Joy-Davila
(74) *Attorney, Agent, or Firm* — Hanley, Flight & Zimmerman, LLC

(57) ABSTRACT

Methods, apparatus, and articles of manufacture are disclosed to improve resource allocation for virtualized server systems. An example apparatus includes a resource identifier to identify a set of external storage resources when a host storage solution is not identified, a storage cost calculator to calculate a cost corresponding to the external storage resource set by comparing a parameter of an external storage resource in the external storage resource set to a requirement, a cost analyzer to determine whether the cost satisfies a cost threshold by comparing the cost to a cost threshold, and a workload domain allocator to allocate the external storage resource set to the workload domain when the cost satisfies the cost threshold.

21 Claims, 16 Drawing Sheets

```
// network_cost, HCI_storage_match_factor, storage_network_cost,
// storage_capacity_cost all normalized to scale of 0 to 1 lowest_cost_set = {};
lowest_cost_external_storage_set = {};
lowest_cost = MAX_INT;
found = FALSE;
all_hosts = {h1, h2, h3, .... hk};
all_external_storage = {s1, s2, s3, .... sk};

N = total hosts needed to create workload domain (WLD);
Q = Storage QoS parameter(s);
C = Storage capacity needed for WLD;
CG = Storage buffer parameter; //Allow for specified % of storage growth
X = Share storage parameter; //Does this storage need to be shared with other WLDs while ((H = get_next_set_of_hosts(all_hosts, N)) is NOT empty)
{
  HCI_storage_match_factor = get_HCI_storage_match(H, Q, X);
  if (HCI_storage_match_factor == 0)
          continue
  storage_capacity = 0;
  foreach host in H {
          storage_capacity += host storage capacity;
  } if (storage_capacity < C * (1 + CG))
          continue;
  storage_capacity_cost =
          get_storage_capacity_overhead(storage_capacity, C, CG);

network_cost = 0;
  foreach host A in H {
          foreach host B in H {
                  network_cost += Roundtrip Time from A to B
          }
  } cost = network_cost + HCI_storage_match_factor + storage_capacity_cost;
  if (cost < lowest_cost) {
          lowest_cost = cost;
          lowest_cost_set = H;
  }
}
```

```
If (lowest_cost == MAX_INT) {
// Did not find suitable HCI storage. Need to use external storage
  while ((H = get_next_set_of_hosts(all_hosts, N)) is NOT empty)
        network_cost = 0;
        foreach host in H {
                network_cost += sum of cost to all other hosts in H;
        }
        lowest_cost_external_storage_set = { };
        while ((S = get_next_external_storage(all_external_storage))
                is NOT empty) {
                external_storage_match_factor =
                        get_storage_external_match(S, Q);
                if (external_storage_match_factor == 0)
                        continue;
                storage_capacity = get_external_storage_capacity(S);
                if (storage_capacity < C * (1 + CG))
                        continue;

storage_capacity_cost = get_storage_capacity_overhead(
                        storage_capacity, C, CG);
                storage_network_cost = get_storage_network_cost(H, S);

cost = network_cost + external_storage_match_factor +
                        storage_capacity_cost + storage_network_cost;
                if (cost < lowest_cost) {
                        lowest_cost = cost;
                        lowest_cost_set = H;
                        lowest_cost_external_storage_set = S;
                }
        }
  }
}
// Repeat external storage algorithm for additional/burst external storage in addition to HCI storage
// Use lowest_cost_set for WLD creation
```

```
int get_HCI_storage_match (H [ ], Q [ ], X) {
        XMatch=0;
        FTTMatch=0;
        IOPSMatch=0;
        LatencyMatch=0;
        DataServicesMatch=0;   /* E.g. Compression, Data Deduplication, Replication */
        TypeMatch=0;
        if ((AllFlash in Q) || (Hybrid in Q))
                foreach Hx in H {
                        if (AllFlash && AllFlash (Hx)) TypeMatch +=1;
                        if (Hybrid && Hybrid (Hx)) TypeMatch +=1;
                }
        if (X)
                XMatch = ((HCI_Storage for H) allows external consumers
                                over iSCSI/NFS/Proprietary protocol)
        /* Does specified HCI host count allow specified Fault Tolerance */
        FTTMatch = (((RAID5 in Q) && (count (H) >= 4)) ||
                ((RAID6 in Q) && (count (H) >= 5)) ||
                ((RAID1 in Q) && (count (H) >= 3)));
        if (IOPS in Q) {
                foreach Hx in H {
                        IOPSMatch = MIN (IOPSMatch, IOPS (H) / IOPS)
                }
        }
        if (Latency in Q) {
                foreach Hx in H {
                        LatencyMatch =
                                MIN (LatencyMatch, Latency/Latency (H))
                }
        }
        foreach DataService in Q {
                if (!DataServiceSupported (HCI_Storage for H))
                        DataServicesMatch = 0;
                else
                        DataServicesMatch = 1;
        MatchFactor = TypeMatch + XMatch + FTTMatch + IOPSMatch +
                LatencyMatch + DataServicesMatch;
        return MatchFactor;
}
```

FIG. 13

```
int get_storage_external_match (S, Q) {
        FTTMatch=0;
        IOPSMatch=0;
        LatencyMatch=0;
        DataServicesMatch=0;   /* E.g. Compression, Data Dedup, Replication */

/* Does specified HCI host count allow specified Fault Tolerance */
        if (RAIDlevel in Q) && supportedRAIDlevel (S, RAIDlevel))
                FTTMatch = 1;

if (IOPS in Q) {
                IOPSMatch = IOPS (S) /IOPS;
        } if (Latency in Q) {
                LatencyMatch = Latency/Latency (H);
        } foreach DataService in Q {
                if (!supportedDataService (S, DataService) {
                        DataServiceMatch = 0;
                        break;
                }
                DataServiceMatch=1;
        }

ExternalMatchFactor = FTTMatch + IOPSMatch + LatencyMatch + DataServicesMatch;
        return ExternalMatchFactor;
}
```

METHODS AND APPARATUS TO IMPROVE EXTERNAL RESOURCE ALLOCATION FOR HYPER-CONVERGED INFRASTRUCTURES BASED ON COSTS ANALYSIS

FIELD OF THE DISCLOSURE

This disclosure relates generally to cloud computing and, more particularly, to methods and apparatus to improve resource allocation for virtualized server systems.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

FIGS. 12A-14 depict example computer readable instructions that may be executed to implement the example resource allocator of FIGS. 2 and/or 3 that may be used to implement the examples disclosed herein.

The figures are not to scale. Wherever possible, the same reference numbers will be used throughout the drawing(s) and accompanying written description to refer to the same or like parts.

DETAILED DESCRIPTION

Figure 1:
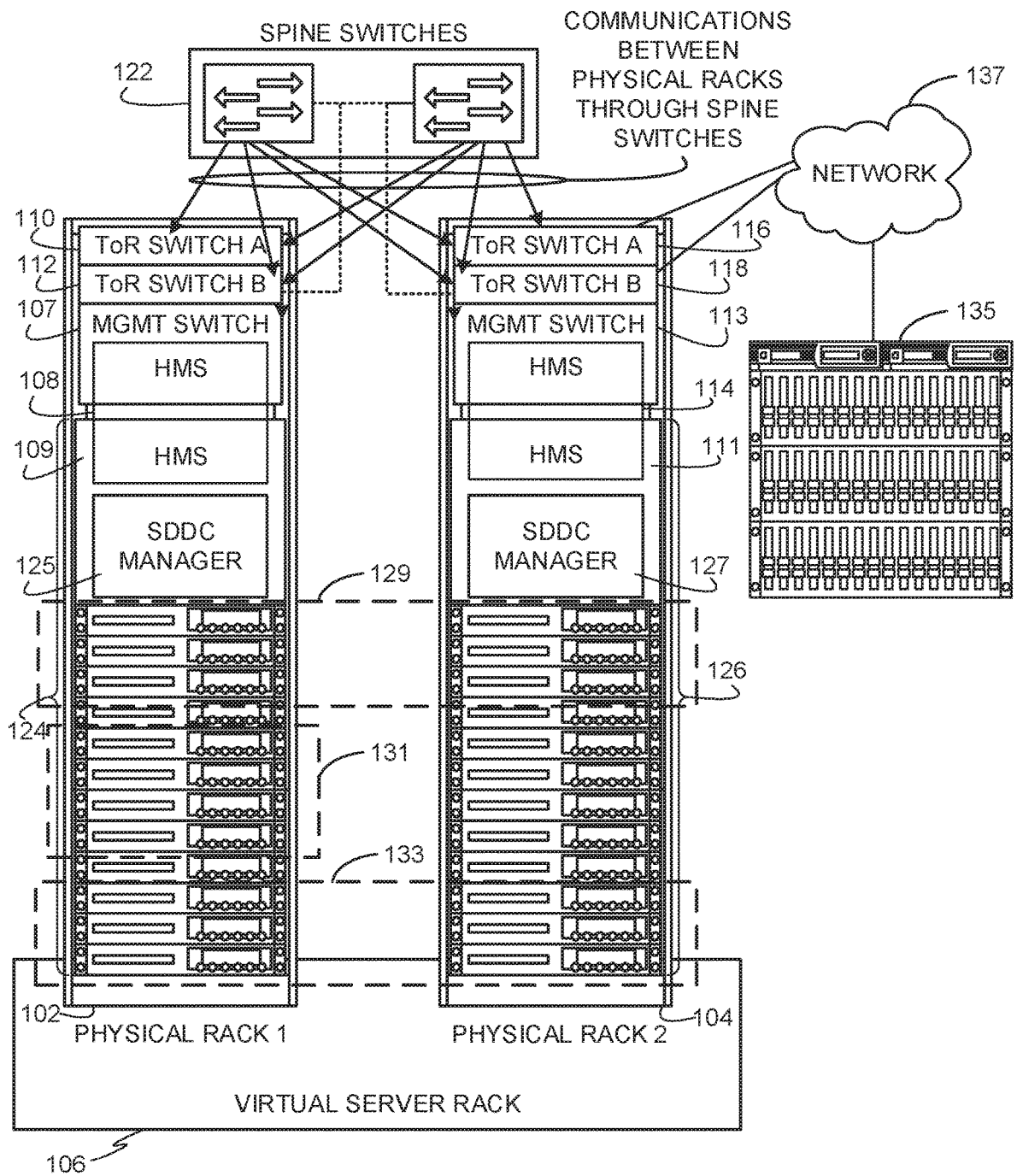
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples described herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples described herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples described herein facilitate making workload domain configuration and management easier than prior techniques.

A management domain is a group of physical machines and VM that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples described herein enable customers to define different domain types, security, machine learning, capacity, availability, and performance requirements for establishing workload domains in server rack deployments without requiring the users to have in-depth knowledge of server rack hardware and/or configurations.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples described herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

Examples disclosed herein improve resource allocation for virtualized server systems. In some examples, a user can specify input requirements such as CPU speed, storage capacity, RAM capacity, etc., for a virtualized server system to complete a workload. In prior examples, a user specified the input requirements and a basic host selection algorithm selected a first available set of hosts based on the input requirements. In such prior examples, the first available set of hosts used only HCI direct attached storage and did not attempt to utilize external storage resources to deploy a workload domain. By using the first available set of hosts, previous workload domain deployments did not efficiently utilize available hardware resources by ignoring storage availability, performance, sharing, and protection requirements. In contrast, examples disclosed herein improve an operation of a virtualized server system by reducing latency between hardware resources, improving storage resource availability and performance, and improving storage resource and/or network loading.

In some examples disclosed herein, the SDDC manager determines a quantity of hosts to perform a workload based on the input requirements and generates a workload domain including one or more hardware resources (e.g., a computing resource, a storage resource, etc.) corresponding to the quantity of hosts. In some examples disclosed herein, the SDDC manager allocates the hosts based on host, network, and/or storage related factors. For example, the SDDC manager may allocate a host based on a location of the host in a server rack, a network, etc. In another example, the SDDC manager may allocate a host based on a network load and/or a network hop count (latency). In yet another example, the SDDC manager may allocate a host based on a storage load, a storage type, storage availability, storage performance, storage sharing requirements across a workload domain or a vSphere cluster, etc., and/or a combination thereof.

In some examples disclosed herein, the SDDC manager determines to allocate a storage resource to a workload domain such as an HCI storage unit or an external Ethernet storage unit (e.g., a storage unit connected via a Network File System (NFS), an Internet Small Computer System Interface (iSCI), etc.). As used herein, the terms "external storage resource" and "external storage resource unit" are used interchangeably and refer to an external Ethernet storage unit or any other type of storage resource external to a host such as an HCI host. For example, the SDDC manager may allocate an HCI storage resource or an external Ethernet storage resource based on storage availability, performance, sharing, and/or protection requirements.

In some examples disclosed herein, the SDDC manager uses a combination of one or more HCI storage resources and one or more external Ethernet storage resources for burst capacity where one or more VMs are included in the one or more HCI storage resources and one or more VMs are included in the one or more external Ethernet storage resources. In some examples disclosed herein, in response to determining the number of hosts requested for a workload domain, the SDDC manager initializes one or more parameters (e.g., resource allocation parameters, storage Quality-of-Service (QoS) parameters, etc.). For example, the SDDC manager may generate a list of all available hosts and/or available external storage resources available to the SDDC manager for workload domain allocation, determine a storage capacity needed for the workload domain, and/or determine a storage buffer parameter for the workload domain.

In some examples disclosed herein, the SDDC manager identifies an HCI storage solution to be allocated to a workload domain. As used herein, the term "HCI storage solution" refers to a storage solution to be allocated to a workload domain that includes one or more HCI hosts and corresponding HCI storage included in the one or more HCI hosts. For example, the SDDC manager may identify a host (e.g., an HCI host) to be allocated to a workload domain where the host includes both computing and storage capabilities in the same node. For example, the SDDC manager may pool together a plurality of nodes to provide increased computing and storage capabilities. In some examples disclosed herein, the SDDC manager selects a set of hosts based on resource capacity requirements and QoS input specifications (e.g., storage QoS parameter).

In some examples disclosed herein, the SDDC manager calculates a storage match factor (e.g., an HCI storage match factor, an external storage match factor, etc.) corresponding to a quantification of how the selected set of hosts satisfy the requirements and input specifications. In response to determining that the storage match factor satisfies a threshold (e.g., an HCI storage match factor threshold, an external storage match factor threshold, etc.), the example SDDC manager may calculate a storage capacity of the selected hosts. In response to determining that the storage capacity of the selected hosts satisfies a threshold (e.g., a storage capacity threshold), the example SDDC manager may calculate a storage capacity cost and a network cost. For example, the storage capacity cost may correspond to the storage capacity of the selected hosts compared to the requested or required storage capacity for the workload domain. In another example, the network cost may correspond to latency between one or more pairs of hosts included in the selected hosts. In some examples disclosed herein, the SDDC manager calculates a resource allocation cost (e.g., a cost, a total cost, etc.) based on the HCI storage match factor, the storage capacity cost, the network cost, etc., and/or a combination thereof. In some examples disclosed herein, the SDDC manager identifies the selected set of hosts as the HCI storage solution to be allocated to the workload domain based on determining that the resource allocation cost satisfies a threshold (e.g., a resource allocation cost threshold, a cost threshold, a total cost threshold, etc.).

In some examples disclosed herein, the SDDC manager is unable to identify an HCI storage solution to be allocated to a workload domain. For example, the SDDC manager may be unable to identify a set of hosts based on the resource capacity requirements, the storage QoS parameters, etc. In another example, the SDDC manager may be unable to identify a set of hosts based on a storage capacity, a cost (e.g., a resource allocation cost, a storage capacity cost, a network cost, etc.), etc., corresponding to one or more selected host sets.

In some examples disclosed herein, the SDDC manager attempts to identify an external storage resource solution to be allocated to the workload domain. For example, the SDDC manager may identify a set of hosts and a set of external storage resource units. In some examples disclosed herein, the SDDC manager calculates a network cost corresponding to the identified set of hosts and calculates an external storage match factor corresponding to the set of external storage resource units. In some examples disclosed herein, the SDDC manager identifies an external storage solution including a set of hosts and a corresponding set of external storage resources based on determining whether an external storage match factor, an external storage capacity, an external cost (e.g., an external storage capacity cost, an external storage network cost, an external resource allocation cost, an external total cost, etc.) satisfy one or more thresholds. In some examples disclosed herein, the SDDC manager identifies a solution such as an HCI storage solution, an external storage solution, etc., to be used to deploy a workload domain. In some examples disclosed herein, the SDDC manager updates one or more parameters (e.g., storage QoS parameters, requirements, etc.) and attempts to identify an HCI storage solution, an external storage solution, etc., based on the one or more updated parameters. In some examples disclosed herein, the SDDC manager generates an alert to a user indicating that a storage solution is unable to be identified based on the input requirements.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes(e.g., compute+storage+network links, etc.), network switches, and, optionally, separate storage units. From a user perspective, the example virtual server rack 106 is an aggregated pool of logic resources exposed as one or more VMWARE® ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR Switch A 110, an example ToR Switch B 112, an example management switch 107, and a plurality of example server host nodes 109 including a first through a twelfth example server host node designated as server host nodes(0-11). For example, the first through the third server host nodes in the plurality of server host nodes 109 in the first physical rack 102 are server host nodes(0-2) 109. In the illustrated example, the management switch 107 and the server host node(0) 109 run a hardware management system (HMS) 108 for the first physical rack 102. The second physical rack 104 of the illustrated example is also provided with an example ToR Switch A 116, an example ToR Switch B 118, an example management switch 113, and a plurality of example server host nodes 111 including a first through a twelfth example server host node designated as server host nodes(0-11). For example, the first through the third server host nodes in the plurality of server host nodes 111 in the second physical rack 104 are server host nodes(0-2) 111. In the illustrated example, the management switch 113 and the server host node(0) 111 run an HMS 114 for the second physical rack 104.

In the illustrated example, the HMS 108, 114 connects to server management ports of the server host node(0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with software-defined data center (SDDC) managers 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the SDDC manager 127 of the second physical rack 104 runs on a cluster of three server host nodes of the second physical rack 104, one of which is the server host node(0) 111.

In the illustrated example, the server host nodes 109, 111 are HCI hosts where computing and storage hardware resources are included in the same node. For example, a storage hardware resource included in the server host(0) 109 of the first physical rack 102 may correspond to a storage type such as a hybrid storage type, an all-flash SSD storage type, an all-flash with non-volatile memory express (NVMe) storage type, an all NVMe storage type, or a persistent memory acceleration storage type. For example, the hybrid storage type may include a cache disk using Serial Attached SCSI (SAS) or Serial ATA (SATA) SSD and a capacity disk using HDD. In another example, the all-flash SSD storage type may include a cache disk using SAS or SATA SSD and a capacity disk using SAS or SATA SSD.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes(e.g., server host nodes(0-2) 109) of the first physical rack 102 using a high availability (HA) mode configuration. In addition, the SDDC manager 127 of the second physical rack 104 runs on a cluster of three server host nodes(e.g., server host nodes (0-2) 111) of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

In the illustrated example of FIG. 1, the SDDC manager 125, 127 allocates server host nodes(0-2) 109 of the first physical rack 102 and server host nodes(0-2) 109 of the second physical rack 104 to a first workload domain 129. The first workload domain 129 of the illustrated example can execute a computing task specified by a user such as executing an application, processing data, performing a calculation, etc. In prior examples, if the server host nodes (0-2) 109 of the first physical rack 102 were unallocated and/or otherwise available to be allocated to a workload domain, the SDDC manager 125, 127 may have allocated the server host nodes(0-2) 109 to the first workload domain 129 based on being the first available server host nodes. In the illustrated example, the SDDC manager 125, 127 allocates the server host nodes(0-2) 109 of the first physical rack 102 to the first workload domain 129 by calculating an HCI storage match factor corresponding to the server host nodes (0-2) 109, comparing the HCI storage match factor to an HCI storage match factor threshold, and determining whether the HCI storage match factor satisfies an HCI storage match factor threshold based on the comparison. For example, the SDDC manager 125, 127 may calculate an HCI storage match factor by analyzing a storage type, a fault tolerance level, a latency value, etc., corresponding to the server host nodes(0-2) 109 of the first physical rack 102 and the server host nodes(0-2) 109 of the second physical rack 104 included in the first workload domain 129.

Further shown in the illustrated example, the SDDC manager 125, 127 allocates the server host nodes(4-7) 109 of the first physical rack 102 to a second workload domain 131. Further shown in the illustrated example, the SDDC manager 125, 127 allocates the server host nodes(9-11) 109 of the first physical rack 102 and the server host nodes(9-11) 109 of the second physical rack 104 to a third workload domain 133. Additionally or alternatively, the example SDDC manager 125, 127 may allocate one or more of the server host nodes(0-11) 109 of the first physical rack to two or more of the workload domains 129, 131, 133.

In the illustrated example of FIG. 1, the SDDC manager 127 of the second physical rack 104 is communicatively coupled to external storage resources 135 via a network 137. Additionally or alternatively, the example SDDC manager 125 of the first physical rack 102 may be communicatively coupled to the external storage resources 135 via the network 137. In the illustrated example of FIG. 1, the SDDC manager 127 queries the external storage resources 135 to determine storage availability, performance, sharing, and/or protection requirements (e.g., storage QoS parameters) of hardware resources included in the external storage resources 135. In the illustrated example of FIG. 1, the external storage resources 135 is a network attached storage (NAS) unit. For example, the external storage resources 135 may include one or more controllers (e.g., specialized servers), one or more interconnect modules, and/or a plurality of storage trays with storage disks.

In some examples, the SDDC manager 125, 127 can allocate an external storage resource included in the external storage resources 135 to the first workload domain 129, the second workload domain 131, the third workload domain 133, etc. For example, the SDDC manager 125, 127 may calculate an external storage match factor corresponding to the external storage resource, compare the external storage match factor to an external storage match factor threshold, and determine whether the external storage match factor threshold has been satisfied based on the comparison. For example, the SDDC manager 125, 127 may calculate a storage match factor by analyzing a failures-to-tolerate (FTT) value, a latency value, etc., corresponding to adding the external storage resource to one of the workload domains 129, 131, 133 depicted in FIG. 1.

In the illustrated example of FIG. 1, the network 137 is the Internet. However, the example network 137 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 137 enables the SDDC manager 127 of the second physical rack 104 to be in communication with the external storage resources 135. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events. Alternatively, the phrase "in communication," including variances therefore, may encompass direct physical communication and/or constant communication.

Figure 2:
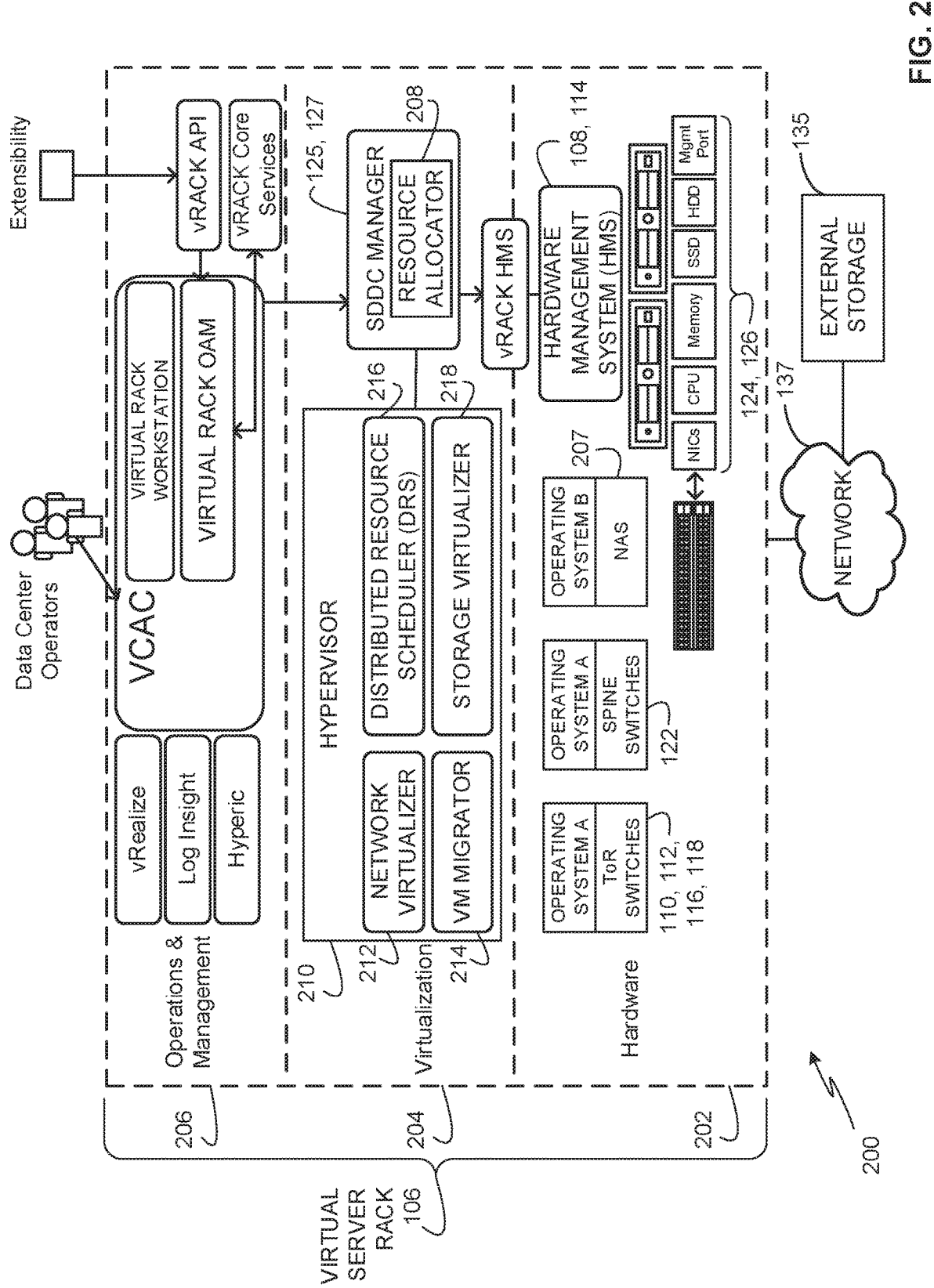
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The NAS hardware 207 of the illustrated example represents the external storage resources 135 of FIG. 1. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes 109, 111 and the ToR switches 110, 112, 116, 118. In the illustrated example, one instance of the HMS 108, 114 runs per physical rack 102, 104. For example, the HMS 108 can run on the management switch 107 and the server host node(0) 109 installed in the example physical rack 102 of FIG. 1. In the illustrated example of FIG. 1 both of the HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 can take over as a primary HMS in the event of a failure of a management switch 107, 113 and/or a failure of the server host nodes(0) 109, 111 on which the other HMS 108, 114 executes.

In some examples, to help achieve or facilitate seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes 109, and the physical rack 104 of FIG. 1 runs two instances of the HMS 114 on two separate physical hardware management switches and two separate server host nodes 111. For example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes 109 in the physical rack 102 (or the two instances of the HMS 114 on two separate management switches and two separate server host nodes 111 in the physical rack 104) are connected over a point-to-point, dedicated Ethernet link which carries heartbeats and memory state synchronization between the primary and secondary HMS instances.

The example virtualization layer 204 of the illustrated example includes the SDDC manager 125, 127. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example, the SDDC manager 125, 127 includes a resource allocator 208 to identify hardware resources to be allocated to a workload domain. For example, the resource allocator 208 may identify the server host nodes(0-2) 109 of the first physical rack 102 to be included in the first workload domain 129 of FIG. 1. In some examples, the resource allocator 208 determines a quantity of hosts to be used to execute an application (e.g., a user application, a workload, etc.). For example, the resource allocator 208 may obtain requirements (e.g., requirements from a user, a database, etc.) corresponding to availability, performance, capacity, etc., for establishing a workload domain and translate the requirements to a quantity of hosts.

In some examples, the resource allocator 208 identifies a set of HCI hosts for allocation to a workload domain based on analyzing the set of HCI hosts. For example, the resource allocator 208 may compare parameters of the HCI host set to storage QoS parameters such as a QoS storage type parameter, a QoS redundant array of independent disks (RAID) parameter, a QoS input/output operations per second (IOPS) parameter, a QoS latency parameter, etc. In some examples, the resource allocator 208 calculates an HCI storage match factor based on comparing the storage QoS parameters to the parameters. In some examples, the resource allocator 208 calculates a cost corresponding to the HCI host set in response to determining that the HCI storage match factor satisfies an HCI storage match factor threshold. In some examples, the resource allocator 208 identifies the HCI host set for allocation to the workload domain based on comparing the cost to a baseline cost or a current cost associated with a previously identified HCI host set.

In some examples, the resource allocator 208 attempts to identify an external storage solution to allocate to a workload domain. In some examples, the resource allocator 208 attempts to identify an external storage solution in conjunction with identifying an HCI host based storage solution. In some examples, the resource allocator 208 attempts to identify an external storage solution in response to not identifying an HCI host based storage solution. For example, the resource allocator 208 may identify a set of external storage resources to couple with HCI hosts for allocation to the workload domain to execute a computing task. In some examples, the resource allocator 208 identifies a set of HCI hosts and a corresponding network cost. In some examples, the resource allocator 208 identifies a set of external storage resources based on calculating an external storage match factor and comparing the external storage match factor to an external storage match factor threshold.

In some examples, in response to determining that the external storage match factor satisfies the external storage match factor threshold based on the comparison, the resource allocator 208 calculates one or more external storage costs such as a storage capacity cost, a storage network cost, etc. In some examples, the resource allocator 208 calculates a resource allocation cost corresponding to the external storage resources set based on the network cost, the external storage match factor, the storage capacity cost, the storage network cost, etc. In some examples, the resource allocator 208 identifies the HCI host set and the corresponding external storage resource set for allocation to the workload domain based on comparing the resource allocation cost to a baseline cost or a current cost associated with a previously identified HCI host set and corresponding external storage resource set.

In some examples, in response to not determining either an HCI storage solution or an external storage resource solution, the resource allocator 208 updates one or more requirements and re-triggers the storage solution identification process. For example, the resource allocator 208 may update a parameter such as a QoS storage type parameter, a QoS IOPS parameter, a QoS latency parameter, etc., and/or a combination thereof by comparing the updated parameter to a rules-based engine, a range of parameter values (e.g., a range specified by a user, a machine-learning algorithm, etc.). In some examples, in response to not determining either an HCI storage solution or an external storage resource solution based on updating (e.g., automatically updating) the one or more requirements, the example resource allocator 208 generates an alert. For example, the resource allocator 208 may generate an alert to a user via a user interface indicating that there are no HCI storage solutions, external storage resource solutions, etc., that satisfy the one or more input requirements. In response to the generation of the alert, the example resource allocator 208 may direct the user interface to prompt the user for a change in requirements.

The example SDDC manager 125, 127 interfaces with an example hypervisor 210 of the virtualization layer 204. The example hypervisor 210 is installed and runs on server hosts in the example physical hardware resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example VM migrator 214, an example distributed resource scheduler (DRS) 216, and an example storage virtualizer 218. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 212 abstracts or virtualizes network resources such as physical hardware switches (e.g., the management switches 107, 113 of FIG. 1, the ToR switches 110, 112, 116, 118, and/or the spine switches 122, etc.) to provide software-based virtual or virtualized networks. The example network virtualizer 212 enables treating physical network resources (e.g., routers, switches, etc.) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX, and is installed as a virtual appliance on any ESX™ host (e.g., the hypervisor 210, etc.) in a vCenter Server environment to provide an aggregated system view for a user. For example, an NSX Manager can map to a single vCenterServer environment and one or more NSX Edge, vShield Endpoint, and NSX Data Security instances. For example, the network virtualizer 212 can generate virtualized network resources such as a logical distributed router (LDR) and/or an edge services gateway (ESG).

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached HDDs and SSDs to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
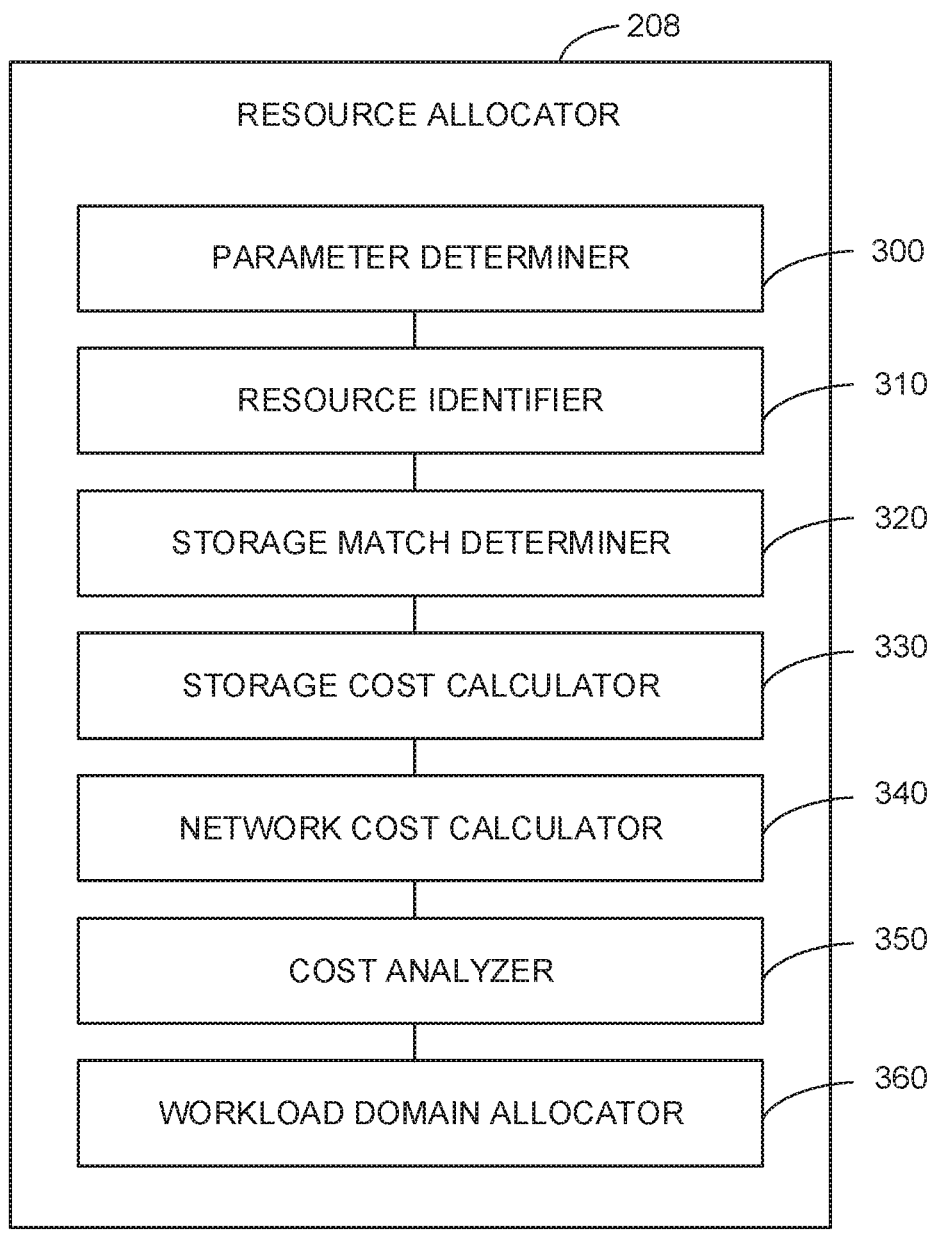
FIG. 3 is a block diagram of an example implementation of the example resource allocator of FIG. 2.

FIG. 3 is an example block diagram of an example implementation of the resource allocator 208 of FIG. 2 to improve resource allocation for generating virtualized server systems. In the illustrated example of FIG. 3, the resource allocator 208 includes an example parameter determiner 300, an example resource identifier 310, an example storage match determiner 320, an example storage cost calculator 330, an example network cost calculator 340, an example cost analyzer 350, and an example resource allocator 360.

In the illustrated example of FIG. 3, the resource allocator 208 includes the parameter determiner 300 to determine one or more parameters. In some examples, the parameter determiner 300 determines a baseline, a default, or an initialization value for the one or more parameters. For example, the parameter determiner 300 may generate a null set for a lowest cost set, a lowest cost external storage set, etc. For example, the lowest cost set may include a set of hosts that have the lowest cost compared to a plurality of other host sets. In another example, the lowest cost external storage set may include a set of external storage resources that have the lowest cost compared to a plurality of other external storage resource sets. In some examples, the parameter determiner 300 determines an initialization value for a cost. For example, the parameter determiner 300 may determine an initialization value for a cost corresponding to a maximum integer value supported by the parameter determiner 300 (e.g., a value of 32,767 for a 16-bit system, a value of 2,147,486,647 for a 32-bit system, etc.).

In some examples, the parameter determiner 300 obtains requirements and/or parameter values from a user, a database, etc. For example, the parameter determiner 300 may determine storage QoS parameter values such as a QoS storage type parameter value, a QoS RAID parameter value, a QoS IOPS parameter value, a QoS latency parameter value, a QoS data services parameter value, etc. For example, the parameter determiner 300 may determine a value of a QoS storage type parameter corresponding to a hybrid storage type, an all-flash SSD storage type, an all-flash with NVMe storage type, an all NVMe storage type, or a persistent memory acceleration storage type. In another example, the parameter determiner 300 may determine a value of a QoS RAID parameter corresponding to whether a set of hosts has a RAID 1 configuration, a RAID 5 configuration, a RAID 6 configuration, etc.

In some examples, the parameter determiner 300 determines resource availability. For example, the parameter determiner 300 may determine a quantity of hosts available to be allocated to a workload domain. In some examples, an available host can be shared. For example, a host may be already allocated to a first workload domain but can be shared with a second workload domain. In such an example, the parameter determiner 300 may determine a shared storage parameter value corresponding to whether a resource (e.g., an HCI host, an external storage resource, etc.) can be shared amongst workload domains. In some examples, the parameter determiner 300 determines a quantity of external storage resource units available to be allocated to a workload domain.

In some examples, the parameter determiner 300 determines a value of a parameter based on requirements. For example, the parameter determiner 300 may determine a quantity of hosts needed to create a workload domain based on availability, performance, sharing, and/or protection requirements. For example, the parameter determiner 300 may determine that three hosts are needed to execute a workload based on obtained processing, storage, security, etc., requirements from a user, a database, etc. In some examples, the parameter determiner 300 determines a quantity of storage capacity needed to create a workload domain. For example, the parameter determiner 300 may determine that a workload domain needs at least 500 GB to execute an application based on obtained processing, storage, security, etc., requirements from a user, a database, etc. In some examples, the parameter determiner 300 determines a value of a storage buffer parameter to accommodate storage growth. For example, the parameter determiner 300 may determine a storage buffer parameter value of 20% to accommodate up to 20% in additional requested storage capacity to execute a workload domain without adding storage resources to the workload domain.

In the illustrated example of FIG. 3, the resource allocator 208 includes the resource identifier 310 to identify candidate resources to be analyzed for workload domain allocation. In some examples, the resource identifier 310 identifies a set of available hosts to be processed. For example, the resource identifier 310 may identify a first set including three hosts to be processed by the storage match determiner 320, the storage cost calculator 330, the network cost calculator 340, etc., and/or a combination thereof. In some examples, the resource identifier 310 identifies a second set including three hosts, where the first set is different than the second set. Alternatively, the example resource identifier 310 may identify fewer or more than three hosts. In some examples, the first and the second set include one or more of the same hosts (e.g., one or more hosts up to N−1 hosts may be the same where N corresponds to a total number of hosts requested to execute a workload domain). In some examples, the first and the second set do not share hosts. In some examples, the resource identifier 310 identifies (e.g., iteratively identifies) sets of hosts for processing until there are no remaining sets of hosts (e.g., combination of hosts) left to process.

In the illustrated example of FIG. 3, the resource allocator 208 includes the storage match determiner 320 to calculate a storage match factor. In some examples, the storage match determiner 320 calculates an HCI storage match factor based on an identified set of hosts, one or more QoS parameters (e.g., storage QoS parameters), and a share storage parameter. Additionally or alternatively, the example storage match determiner 320 may calculate the HCI storage match factor using fewer or more parameters. For example, the HCI storage match factor may correspond to a quantification of how storage included in an identified set of HCI hosts compares or matches to pre-determined, pre-identified, etc., requirements by evaluating the one or more storage QoS parameters. For example, HCI storage with a higher HCI storage match factor may correspond to matching pre-determined requirements better than HCI storage with a lower HCI storage match factor.

In some examples, the storage match determiner 320 obtains the storage QoS parameters such as a QoS storage type parameter, a QoS RAID parameter, a QoS IOPS parameter, a QoS latency parameter, a QoS data services parameter, etc. For example, the QoS storage type parameter may include a value corresponding to a requirement that storage for a workload domain be a hybrid storage type, an all flash NVMe storage type, etc. In another example, the QoS RAID parameter may include a value corresponding to a requirement that storage for a workload domain be configured using a RAID 1, RAID 5, RAID 6, etc., configuration. In yet another example, the QoS IOPS parameter may include a value corresponding to a requirement that storage for a workload domain be evaluated using IOPS. In another example, the QoS latency parameter may include a value corresponding to a requirement that storage for a workload domain be evaluated using latency. In yet another example, the QoS data services parameter may include a value corresponding to a requirement that storage for a workload domain be evaluated for one or more data services.

In some examples, the storage match determiner 320 calculates the HCI storage match factor based on calculating one or more storage match parameters such as a share storage match parameter, a type match parameter, an FTT match parameter, an IOPS match parameter, a latency match parameter, a data services match parameter, etc. In some examples, the storage match determiner 320 determines the share storage parameter. For example, the storage match determiner 320 may determine the share storage match parameter based on obtaining a share storage parameter. For example, the storage match determiner 320 may calculate a share storage parameter value indicating that an HCI host storage may be shared by an external computing system via an iSCSI protocol, an NFS protocol, or any other type of communication connection based on the share storage match parameter.

In some examples, the storage match determiner 320 determines the type match parameter by identifying a type of storage included in an HCI host and comparing the storage type to a storage QoS parameter. For example, the storage match determiner 320 may determine that the QoS storage type parameter corresponds to a hybrid storage type. The example storage match determiner 320 may determine that an HCI host in an HCI host set includes a hybrid storage type. In such an example, the storage match determiner 320 may calculate the type match parameter based on a quantity of HCI hosts in an HCI host set that match the QoS storage type parameter. For example, the storage match determiner 320 may calculate a type match parameter value of two when the storage type of two hosts in an HCI host set match the QoS storage type.

In some examples, the storage match determiner 320 determines the FTT match parameter based on the QoS RAID parameter. For example, the storage match determiner 320 may compare a RAID configuration of an HCI host storage to a RAID configuration indicated by the QoS RAID parameter. For example, the storage match determiner 320 may calculate an FTT match parameter value of one when the QoS RAID parameter indicates a RAID 5 configuration and there are four or more hosts in an HCI host set. In another example, the storage match determiner 320 may calculate an FTT match parameter value of zero when the QoS RAID parameter indicates a RAID 5 configuration and there are four or fewer hosts in an HCI host set.

In some examples, the storage match determiner 320 determines an IOPS match parameter based on a QoS IOPS parameter. For example, the storage match determiner 320 may determine that the QoS IOPS parameter indicates that each HCI host in an HCI host set be evaluated for IOPS. For example, the storage match determiner 320 may calculate an IOPS value for each HCI host and calculate an IOPS match parameter based on a minimum value of the calculated IOPS values. For example, the storage match determiner 320 may calculate a first IOPS value of 40,000 for a first host, a second IOPS value of 42,000 for a second host, and a third IOPS value of 44,000 for a third host. In such an example, the storage match determiner 320 may calculate an IOPS match parameter of 40,000 based on a minimum value of 40,000 of the first through the third IOPS values.

In some examples, the storage match determiner 320 determines a latency match parameter based on a QoS latency parameter. For example, the storage match determiner 320 may determine that the QoS latency parameter indicates that each HCI host in an HCI host set be evaluated for latency. For example, the storage match determiner 320 may calculate a latency value for each HCI host and calculate a latency match parameter based on a minimum value of the calculated latency values. For example, the storage match determiner 320 may calculate a first latency value of 20 milliseconds for a first host, a second latency value of 22 milliseconds for a second host, and a third latency value of 25 milliseconds for a third host. In such an example, the storage match determiner 320 may calculate an latency match parameter of 20 milliseconds based on a minimum value of 20 milliseconds of the first through the third latency values.

In some examples, the storage match determiner 320 determines a data services match parameter based on a QoS data services parameter. For example, the storage match determiner 320 may determine that the QoS data services parameter indicates that the storage virtualizer 218 of the virtualization layer 204 is to be evaluated for one or more data service capabilities such as compression, data dedupli-cation, replication, etc. For example, the storage match determiner 320 may calculate a data services match parameter by comparing the data services of the storage virtualizer 218 (e.g., data services capable of being executed, provided, supported, etc., by the storage virtualizer 218) corresponding to a cluster of hosts (e.g., one or more of the server host nodes 109 of the first physical rack 102, one or more of the server host nodes 109 of the second physical rack 104, one or more components of the external storage resources 135, etc., and/or a combination thereof) to data services indicated by the QoS data services parameter. For example, the storage match determiner 320 may calculate a data services match parameter value of one when the data services of the storage virtualizer 218 matches the data services corresponding to the QoS data services parameter. In another example, the storage match determiner 320 may calculate a data services match parameter value of zero when one or more of the data services of the storage virtaulizer 218 do not match the data services corresponding to the QoS data services parameter.

In some examples, the storage match determiner 320 calculates an external storage match factor based on an identified set of external storage resources and one or more storage QoS parameters. Additionally or alternatively, the example storage match determiner 320 may calculate the external storage match factor using fewer or more parameters. For example, the external storage match factor may correspond to a quantification of how an external storage resource compares or matches to pre-determined, pre-identified, etc., requirements by evaluating the one or more storage QoS parameters. For example, an external storage resource set with a higher external storage match factor may correspond to matching pre-determined requirements better than an external storage resource set with a lower external storage match factor.

In some examples, the storage match determiner 320 calculates an external storage match factor based on an FTT match parameter, an IOPS match parameter, a latency match parameter, a data services match parameter, etc. For example, the storage match determiner 320 may calculate the FTT match parameter, the IOPS match parameter, the latency match parameter, and/or the data services match parameter as described above in connection with the HCI storage match factor.

In some examples, the storage match determiner 320 determines whether an HCI storage match factor, an external storage match factor, etc., satisfies a threshold. For example, the storage match determiner 320 may compare an HCI storage match factor to an HCI storage match factor threshold and determine whether the HCI storage match factor satisfies the HCI storage match factor threshold based on the comparison. In response to determining that the HCI storage match factor threshold has been satisfied, the example storage cost calculator 330 may calculate a storage capacity associated with the HCI host set. In another example, the storage match determiner 320 may compare an external storage match factor to an external storage match factor threshold and determine whether the external storage match factor satisfies the external storage match factor threshold based on the comparison. In response to determining that the external storage match factor threshold has been satisfied, the example storage cost calculator 330 may calculate a storage capacity associated with the external storage resource set.

In the illustrated example of FIG. 3, the resource allocator 208 includes the storage cost calculator 330 to calculate a storage cost associated with a storage solution. In some examples, the storage cost calculator 330 calculates a storage cost associated with an HCI host set. For example, the storage cost calculator 330 may calculate a storage capacity of each HCI host in an HCI host set and calculate a storage capacity of the HCI host set based on the calculated storage capacities of the HCI hosts. In some examples, the storage cost calculator 330 calculates a storage cost associated with an external storage resource set. For example, the storage cost calculator 330 may calculate a storage capacity of each external storage resource in an external storage resource set and calculate a storage capacity of the external storage resource set based on the calculated storage capacities of the external storage resources.

In some examples, the storage cost calculator 330 determines whether a storage capacity satisfies a storage capacity threshold based on a storage buffer parameter. For example, the storage cost calculator 330 may determine a storage capacity threshold by multiplying a storage capacity requested for a workload domain by a storage buffer parameter. For example, the storage cost calculator 330 may determine a storage capacity threshold of 360 GB based on a requested storage capacity of 300 GB and a storage buffer parameter of 0.2 corresponding to a 20% storage buffer (e.g., 360 GB=300 GB×(1+0.2)). For example, the storage cost calculator 330 may compare a storage capacity of an HCI host set of 500 GB to the storage capacity threshold of 360 GB and determine that the storage capacity is greater than the storage capacity threshold and, thus, satisfies the storage capacity threshold.

In some examples, in response to determining that the storage capacity of an HCI set satisfies the storage capacity threshold, the storage cost calculator 330 calculates a storage capacity cost. For example, the storage cost calculator 330 may calculate a storage capacity cost corresponding to a storage capacity overhead. For example, the storage capacity cost may correspond to an excess of storage included in an HCI storage set compared to requested storage for a workload domain. For example, the storage cost calculator 330 may determine that the requested storage for the workload domain is 300 GB, the storage capacity of the HCI host set is 500 GB, and the storage buffer parameter of 0.2. In such an example, the storage cost calculator 330 may determine that the storage capacity cost is 140 GB (e.g., 140 GB=500 GB−(300 GB*(1+0.2))). In some examples, the storage capacity cost is scaled within a pre-determined range (e.g., a range of 0-1000 GB normalized to a range of 0-1). For example, the storage capacity cost of 140 GB may be normalized to 0.14. In some examples, the storage cost calculator 330 calculates a storage capacity cost associated with an external storage resource set as described above in connection with an HCI host set.

In the illustrated example of FIG. 3, the resource allocator 208 includes the network cost calculator 340 to calculate a network cost corresponding to a storage solution. In some examples, the network cost calculator 340 calculates a network cost corresponding to an HCI storage solution. For example, a network cost for a pair of HCI hosts may correspond to an amount of time for a data packet (e.g., an Internet Control Message Protocol (ICMP) data packet, an ICMP echo request packet, etc.) to be transmitted from a first HCI host in the pair to a second HCI host in the pair. In such an example, the network cost calculator 340 may calculate a total network cost based on a plurality of network costs corresponding to each combination of pairs in an HCI host set.

In some examples, the network cost calculator 340 calculates a network cost corresponding to an external storage solution. For example, a network cost corresponding to an external storage solution may represent an amount of time for a data packet to be transmitted from an HCI host to an external storage resource. In such an example, the network cost calculator 340 may calculate a total network cost based on a plurality of network costs corresponding to a plurality of pair combinations of HCI hosts and external storage resources.

In the illustrated example of FIG. 3, the resource allocator 208 includes the cost analyzer 350 to calculate a resource allocation cost corresponding to a storage solution and determine whether the resource allocation cost satisfies a resource allocation cost threshold. For example, the resource allocation cost may be a cost inclusive of costs associated with network and storage hardware and operational considerations. In some examples, the resource allocation cost threshold corresponds to a resource allocation cost for a previously processed storage solution. In some examples, the resource allocation cost threshold corresponds to a baseline resource allocation cost. For example, the cost analyzer 350 may calculate a resource allocation cost for an HCI storage solution based on a network cost, an HCI storage match factor, and/or a storage capacity cost. In response to calculating the resource allocation cost, the example cost analyzer 350 may compare the resource allocation cost to a resource allocation cost threshold and determine that the resource allocation cost threshold has been satisfied based on the comparison.

In some examples, the cost analyzer 350 identifies a storage solution (e.g., an HCI storage solution, an external storage solution, etc.) to be allocated to a workload domain. For example, in response to determining that the resource allocation cost for a storage solution satisfies a resource allocation cost threshold, the cost analyzer 350 may identify the storage solution as a candidate storage solution to be allocated to workload domain. For example, the cost analyzer 350 may compare a first resource allocation cost for a first set of HCI hosts to a first resource allocation cost threshold and determine that the first resource allocation cost threshold has been satisfied based on the comparison (e.g., the first resource allocation cost is less than the first resource allocation cost threshold). The example cost analyzer 350 may identify the first set of HCI host as a candidate storage solution to be allocated to a workload domain. The example cost analyzer 350 may replace the first resource allocation cost threshold with a second resource allocation cost threshold equal to the first resource allocation cost.

In some examples, the cost analyzer 350 compares a second resource allocation cost for a second set of HCI hosts to the second resource allocation cost threshold. In response to determining that the second resource allocation cost satisfies the second resource allocation cost threshold (e.g., the second resource allocation cost is less than the second resource allocation cost threshold), the example cost analyzer 350 may discard the first set of HCI hosts and identify the second set of HCI hosts as a candidate storage solution to be allocated to the workload domain. In another example, in response to determining that the second resource allocation cost does not satisfy the second resource allocation cost threshold (e.g., the second resource allocation cost is greater than the second resource allocation cost threshold), the example cost analyzer 350 may discard the second set of HCI hosts as a potential candidate storage solution to be allocated to the workload domain.

In the illustrated example of FIG. 3, the resource allocator 208 includes the workload domain allocator 360 to allocate a candidate storage solution to a workload domain. For example, in response to the cost analyzer 350 identifying an HCI host set as a candidate storage solution, an HCI host set and a corresponding external storage resource set as a candidate storage solution, etc., the workload domain allocator 360 may associate the candidate storage solution with the workload domain when the workload domain is ready for deployment. In some examples, the workload domain allocator 360 generates an alert when a storage solution is unable to be identified. For example, the workload domain allocator 360 may generate an alert to a user via a user interface indicating that a storage solution is unable to be identified. In another example, the workload domain allocator 360 may direct the user interface to prompt the user for a change in one or more requirements to re-trigger the storage solution identification process.

While an example manner of implementing the resource allocator 208 of FIG. 2 is illustrated in FIG. 3, one or more of the elements, processes and/or devices illustrated in FIG. 3 may be combined, divided, re-arranged, omitted, eliminated, and/or implemented in any other way. Further, the example parameter determiner 300, the example resource identifier 310, the example storage match determiner 320, the example storage cost calculator 330, the example network cost calculator 340, the example cost analyzer 350, the example workload domain allocator, and/or, more generally, the example resource allocator 208 of FIG. 2 may be implemented by hardware, software, firmware and/or any combination of hardware, software and/or firmware. Thus, for example, any of the example parameter determiner 300, the example resource identifier 310, the example storage match determiner 320, the example storage cost calculator 330, the example network cost calculator 340, the example cost analyzer 350, the example workload domain allocator, and/or, more generally, the example resource allocator 208 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter determiner 300, the example resource identifier 310, the example storage match determiner 320, the example storage cost calculator 330, the example network cost calculator 340, the example cost analyzer 350, and/or the example workload domain allocator 360 is/are hereby expressly defined to include a non-transitory computer readable storage device or storage disk such as a memory, a digital versatile disk (DVD), a compact disk (CD), a Blu-ray disk, etc. including the software and/or firmware. Further still, the example resource allocator 208 of FIG. 2 may include one or more elements, processes and/or devices in addition to, or instead of, those illustrated in FIG. 3, and/or may include more than one of any or all of the illustrated elements, processes, and devices.

Flowcharts representative of example machine readable instructions for implementing the resource allocator 208 of FIGS. 2 and/or 3 are shown in FIGS. 4-14. In these examples, the machine readable instructions comprise a program for execution by a processor such as a processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 4-14, many other methods of implementing the example resource allocator 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-14 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 4:
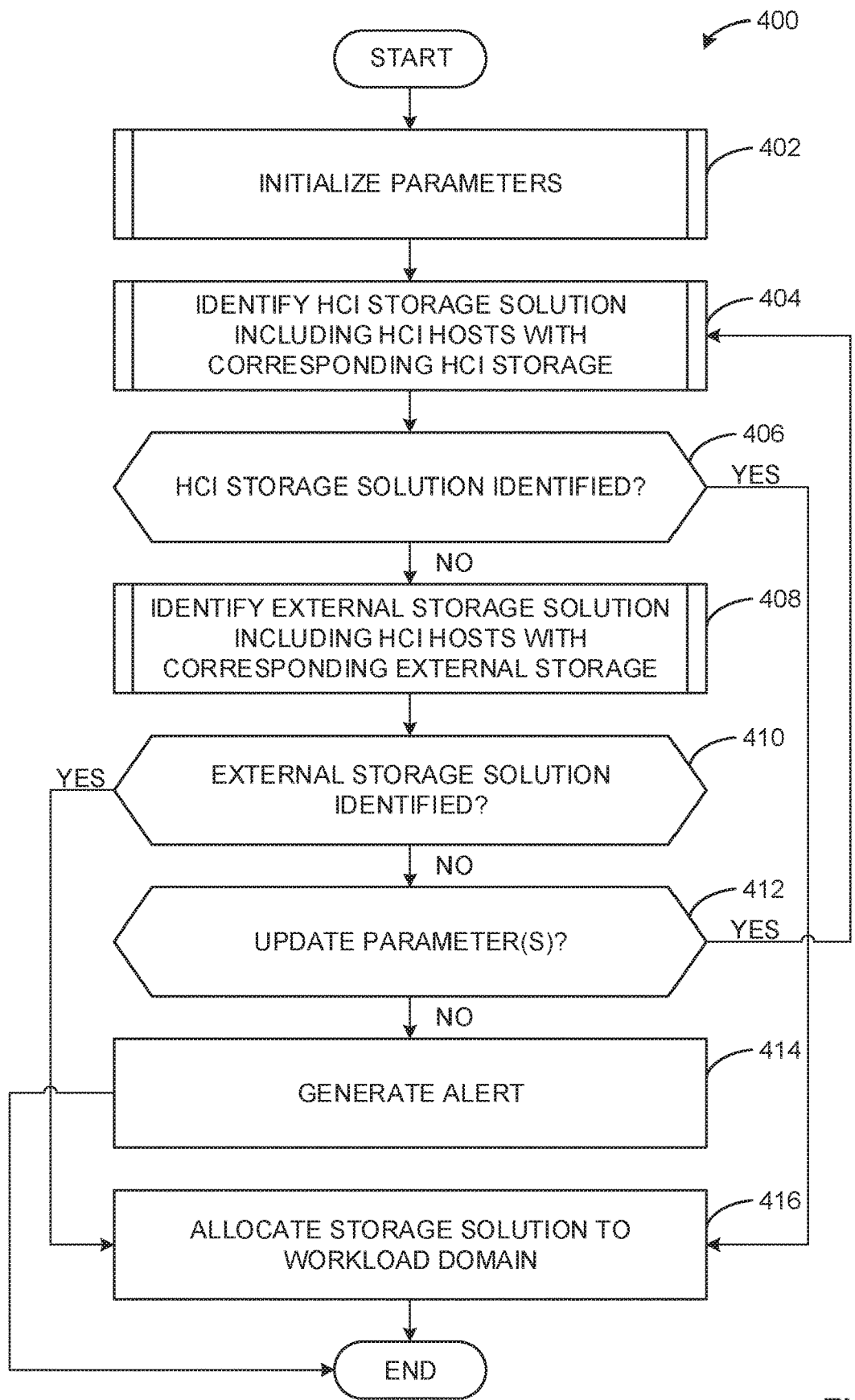
FIGS. 4-11 are flowcharts representative of example methods that can be executed by the example resource allocator of FIGS. 2 and/or 3 to improve resource allocation for virtualized server systems.

FIG. 4 is a flowchart representative of an example method 400 that may be performed by the example resource allocator 208 of FIGS. 2 and/or 3 to identify a storage solution to be allocated to a workload domain. The example method 400 of FIG. 4 begins at block 402, at which the example resource allocator 208 initializes parameters. For example, the parameter determiner 300 may obtain hosts and/or external storage units available to be allocated to a workload domain. In another example, the parameter determiner 300 may determine one or more storage QoS parameters, a total quantity of hosts to fulfill a request to generate a workload domain, etc. An example process that may be used to implement block 402 is described below in connection with FIG. 5.

At block 404, the example resource allocator 208 identifies an HCI storage solution including HCI hosts with corresponding HCI storage. For example, the cost analyzer 350 may identify an HCI host set to be allocated to a workload domain based on comparing a resource allocation cost of the HCI host set to a resource allocation cost threshold and determining that the resource allocation cost threshold has been satisfied based on the comparison. An example process that may be used to implement block 404 is described below in connection with FIG. 6.

At block 406, the example resource allocator 208 determines whether an HCI storage solution has been identified. For example, the cost analyzer 350 may determine that a resource allocation cost corresponding to an HCI storage solution including three HCI hosts and corresponding HCI storage satisfies a resource allocation cost threshold. In response to determining that the resource allocation cost satisfies the resource allocation cost threshold, the example cost analyzer 350 may identify the three HCI hosts and the corresponding HCI storage as an HCI storage solution.

If, at block 406, the example resource allocator 208 determines that the HCI storage solution has been identified, control proceeds to block 416 to allocate the storage solution to a workload domain. For example, the workload domain allocator 360 may allocate resources included in the identified solution (e.g., an identified HCI storage solution, an identified external storage solution, etc.) to a workload domain. If, at block 406, the example resource allocator 208 determines that the HCI storage solution has not been identified, then, at block 408, the resource allocator 208 identifies an external storage solution including HCI hosts with corresponding external storage.

For example, the cost analyzer 350 may determine that an external resource allocation cost corresponding to an external storage solution including three HCI hosts and corresponding external storage resources satisfies an external resource allocation cost threshold. In response to determining that the external resource allocation cost satisfies the external resource allocation cost threshold, the example cost analyzer 350 may identify the three HCI hosts and the corresponding external storage resources as an external storage solution. An example process that may be used to implement block 408 is described below in connection with FIG. 10.

At block 410, the example resource allocator 208 determines whether an external storage solution has been identified. For example, the cost analyzer 350 may determine that an external resource allocation cost corresponding to an external resource allocation solution including three HCI hosts and corresponding external storage resources satisfies an external resource allocation cost threshold. In response to determining that the external resource allocation cost satisfies the external resource allocation cost threshold, the example cost analyzer 350 may identify the three HCI hosts and the corresponding external storage resources as an external storage solution.

If, at block 410, the example resource allocator 208 determines that the external storage solution has been identified, control proceeds to block 416 to allocate the storage solution to a workload domain. If, at block 410, the example resource allocator 208 determines that the external storage solution has not been identified, then, at block 412, the resource allocator 208 determines whether to update parameter(s). For example, the parameter determiner 300 may determine to update a QoS parameter, a storage buffer parameter, a share storage parameter, etc., and/or a combination thereof.

If, at block 412, the example resource allocator 208 determines to update one or more parameters, control returns to block 404 to attempt to identify an HCI storage solution including hosts with corresponding HCI storage using the updated parameter(s). If, at block 412, the example resource allocator 208 determines not to update the parameter(s), then, at block 414, the resource allocator 208 generates an alert. For example, the workload domain allocator 360 may generate an alert to a user indicating that a workload domain may not be feasible based on provided requirements. In response to generating the alert, the example method 400 concludes.

Figure 5:
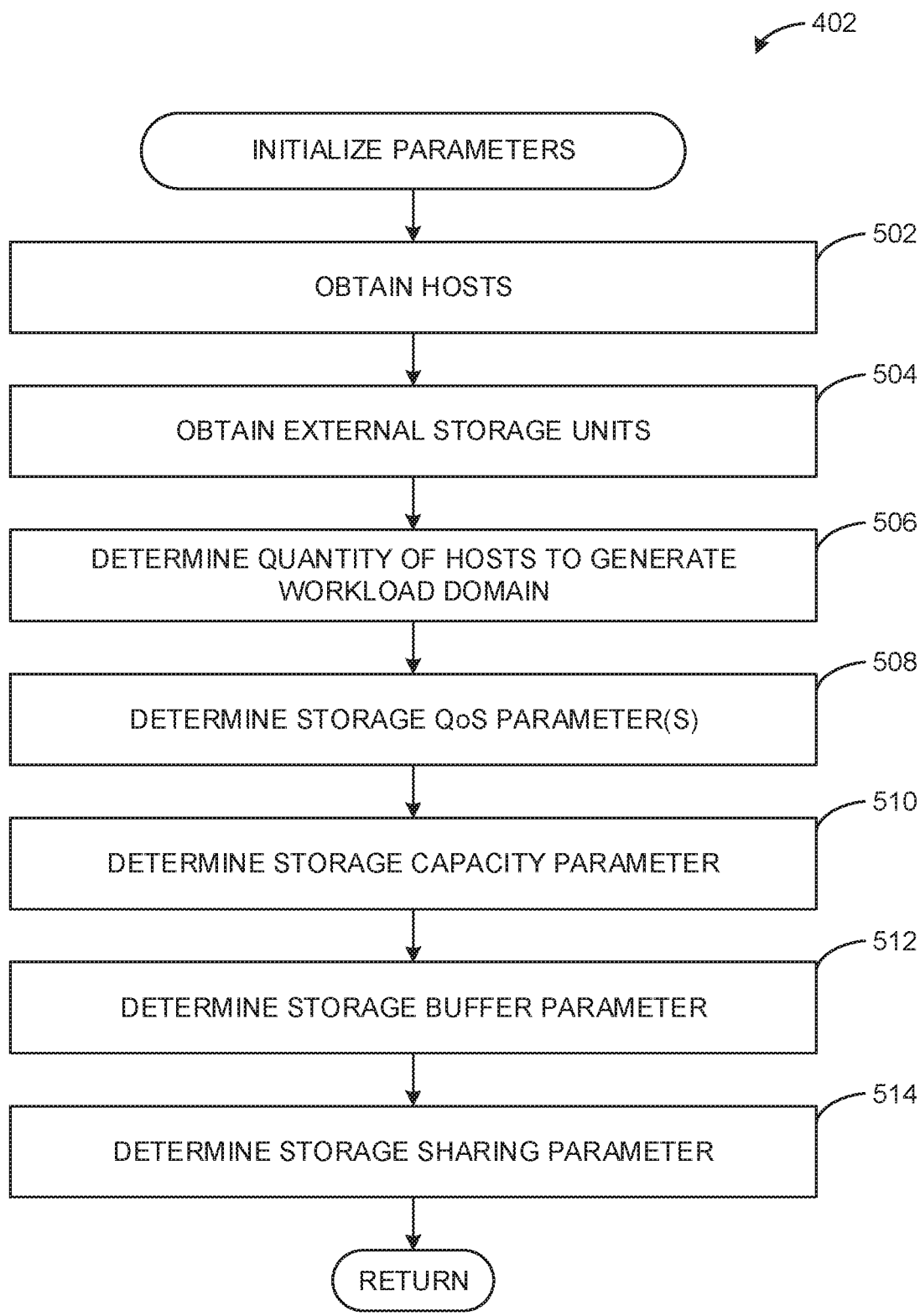

FIG. 5 is a flowchart representative of an example implementation of block 402 that may be performed by the example resource allocator 208 of FIGS. 2 and/or 3 to initialize parameters. The example implementation of block 402 begins at block 502, at which the example resource allocator 208 obtains hosts. For example, the parameter determiner 300 may obtain one or more hosts available to be allocated to a workload domain.

At block 504, the example resource allocator 208 obtains external storage units. For example, the parameter determiner 300 may obtain one or more external storage resources to be allocated to a workload domain. At block 506, the example resource allocator 208 determines a quantity of hosts to generate a workload domain. For example, the parameter determiner 300 may determine that three hosts are needed to execute a workload based on availability, performance, etc., requirements specified by a user, obtained from a database, etc.

At block 508, the example resource allocator 208 determines storage QoS parameter(s). For example, the parameter determiner 300 may determine a value for one or more storage QoS parameters such as a QoS storage type parameter, a QoS RAID parameter, a QoS IOPS parameter, a QoS latency parameter, a QoS data services parameter, etc. At block 510, the example resource allocator 208 determines a storage capacity parameter. For example, the parameter determiner 300 may determine a quantity of storage resources (e.g., 100 GB, 500 GB, etc.) to be allocated to a workload domain based on the one or more requirements.

At block 512, the example resource allocator 208 determines a storage buffer parameter. For example, the parameter determiner 300 may determine a percentage of excess storage (e.g., a 10% storage buffer, a 25% storage buffer, etc.) to be included in a storage solution to be allocated to a workload domain. At block 514, the example resource allocator 208 determines a storage sharing parameter. For example, the parameter determiner 300 may determine a value for the storage sharing parameter indicating whether one or more storage resources can be shared among two or more workload domains. In response to determining the storage sharing parameter, the example implementation of block 402 returns to block 404 of the example method 400 of FIG. 4 to identify an HCI storage solution including HCI hosts with corresponding HCI storage.

Figure 6:
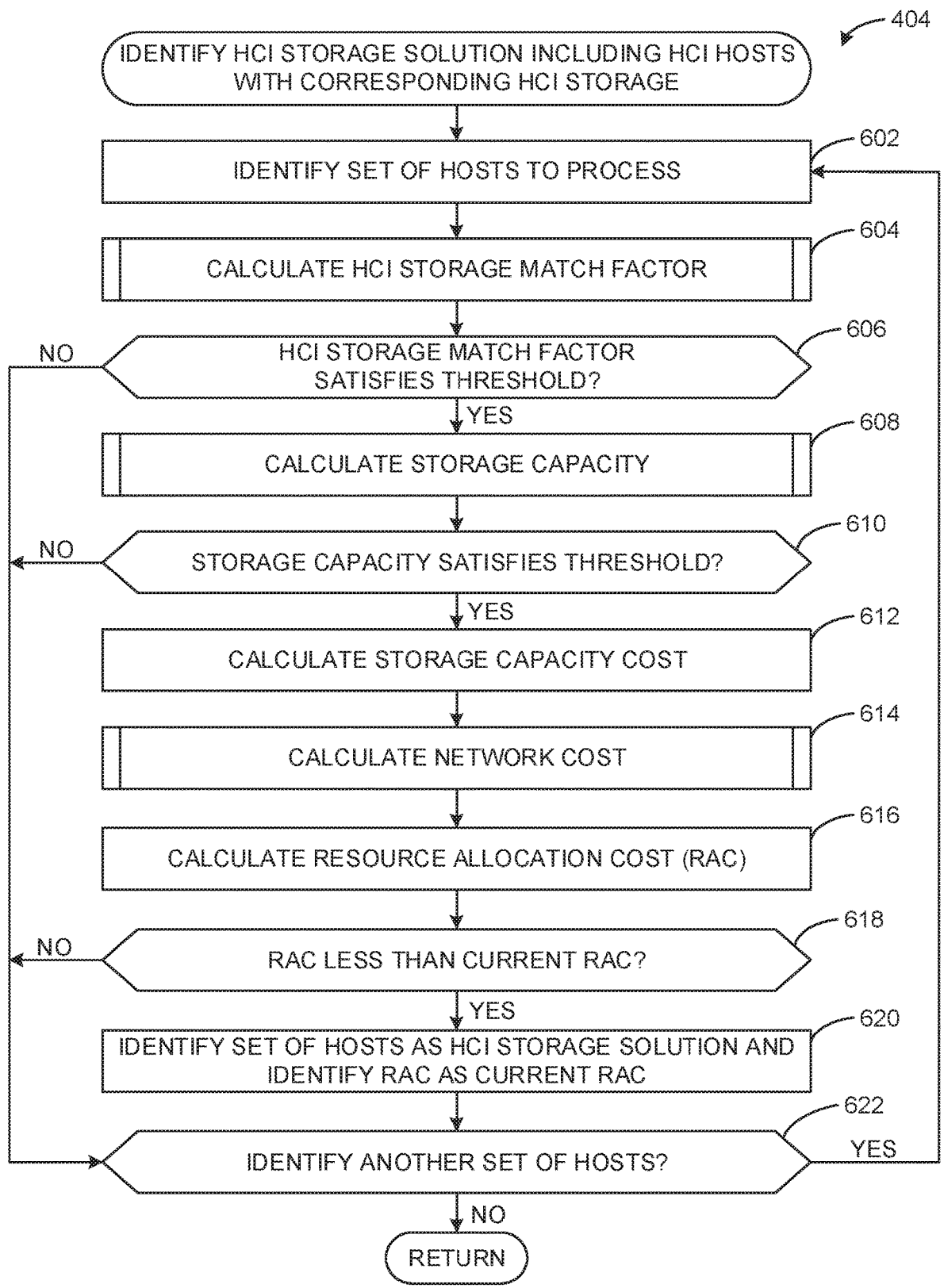

FIG. 6 is a flowchart representative of an example implementation of block 404 that may be performed by the example resource allocator 208 of FIGS. 2 and/or 3 to identify an HCI storage solution including HCI hosts with corresponding HCI storage. The example implementation of block 404 begins at block 602, at which the example resource allocator 208 identifies a set of hosts. For example, the resource identifier 310 may identify three HCI hosts with corresponding HCI storage to process. In such an example, the resource identifier 310 may identify the three HCI hosts based on the parameter determiner 300 determining three host are needed to generate a workload domain based on the one or more requirements.

At block 604, the example resource allocator 208 calculates an HCI storage match factor. For example, the storage match determiner 320 may calculate an HCI storage match factor associated with the three hosts and corresponding HCI storage. An example process that may be used to implement block 604 is described below in connection with FIG. 7.

At block 606, the example resource allocator 208 determines whether the HCI storage match factor satisfies a threshold. For example, the storage match determiner 320 may compare the HCI storage match factor to an HCI storage match factor threshold and determine that the HCI storage match factor threshold has been satisfied based on the comparison. For example, the storage match determiner 320 may determine that the HCI storage match factor threshold has been satisfied based on determining that the HCI storage match factor is greater than the HCI storage match factor threshold.

If, at block 606, the example resource allocator 208 determines that the HCI storage match factor does not satisfy the threshold, control proceeds to block 622 to determine whether to identify another set of hosts. If, at block 606, the example resource allocator 208 determines that the HCI storage match factor does satisfy the threshold, then, at block 608, the resource allocator 208 calculates a storage capacity. For example, the storage cost calculator 330 may calculate a storage capacity of the HCI storage included in the three hosts. An example process that may be used to implement block 608 is described below in connection with FIG. 8.

At block 610, the example resource allocator 208 determines whether the storage capacity satisfies a threshold. For example, the storage cost calculator 330 may compare the storage capacity to a storage capacity threshold and determine that the storage capacity threshold has been satisfied based on the comparison. For example, the storage cost calculator 330 may determine that the storage capacity threshold has been satisfied based on determining that the storage capacity of the storage included in the three HCI hosts is greater than the storage capacity threshold.

If, at block 610, the example resource allocator 208 determines that the storage capacity does not satisfy the threshold, control proceeds to block 622 to determine whether to identify another set of hosts. If, at block 610, the example resource allocator 208 determines that the storage capacity satisfies the threshold, then, at block 612, the resource allocator 208 calculates a storage capacity cost. For example, the storage cost calculator 330 may calculate a storage capacity cost corresponding to the storage capacity of the HCI storage included in the three HCI hosts compared to the requested storage capacity for the workload domain.

At block 614, the example resource allocator 208 calculates a network cost. For example, the network cost calculator 340 may calculate a network cost associated with the three HCI hosts and the corresponding HCI storage. An example process that may be used to implement block 614 is described below in connection with FIG. 9.

At block 616, the example resource allocator 208 calculates a resource allocation cost. For example, the cost analyzer 350 may calculate a resource allocation cost associated with the three HCI hosts and the corresponding HCI storage. For example, the cost analyzer 350 may calculate the resource allocation cost based on the HCI storage match factor, the storage capacity cost, the network cost, etc., corresponding to the three HCI hosts and the corresponding HCI storage.

At block 618, the example resource allocator 208 determines whether the resource allocation cost is less than a current resource allocation cost. For example, the cost analyzer 350 may compare the resource allocation cost of the three HCI hosts and the corresponding HCI storage to the current resource allocation cost corresponding to a baseline cost or a calculated resource allocation cost associated with a previously identified set of hosts and corresponding storage.

If, at block 618, the example resource allocator 208 determines that the resource allocation cost is greater than the current resource allocation cost, control proceeds to block 622 to determine whether to identify another set of hosts. If, at block 618, the example resource allocator 208 determines that the resource allocation cost is less than the current resource allocation cost, then, at block 620, the resource allocator 208 identifies the set of hosts as an HCI storage solution and identifies the associated resource allocation cost as the current resource allocation cost. For example, in response to determining that the resource allocation cost is less than the current resource allocation cost, the cost analyzer 350 may identify the three HCI host with the corresponding HCI storage as the HCI storage solution to be allocated to the workload domain if no further host sets are to be processed.

At block 622, the example resource allocator 208 determines whether to identify another set of hosts. For example, the resource identifier 310 may determine that there is not another set of hosts (e.g., another combination of hosts) to be processed. If, at block 622, the example resource allocator 208 determines to identify another set of hosts, control returns to block 604 to identify another set of hosts, otherwise the example implementation of block 404 returns to block 406 of the example method 400 of FIG. 4 to determine whether an HCI storage solution has been identified.

Figure 7:
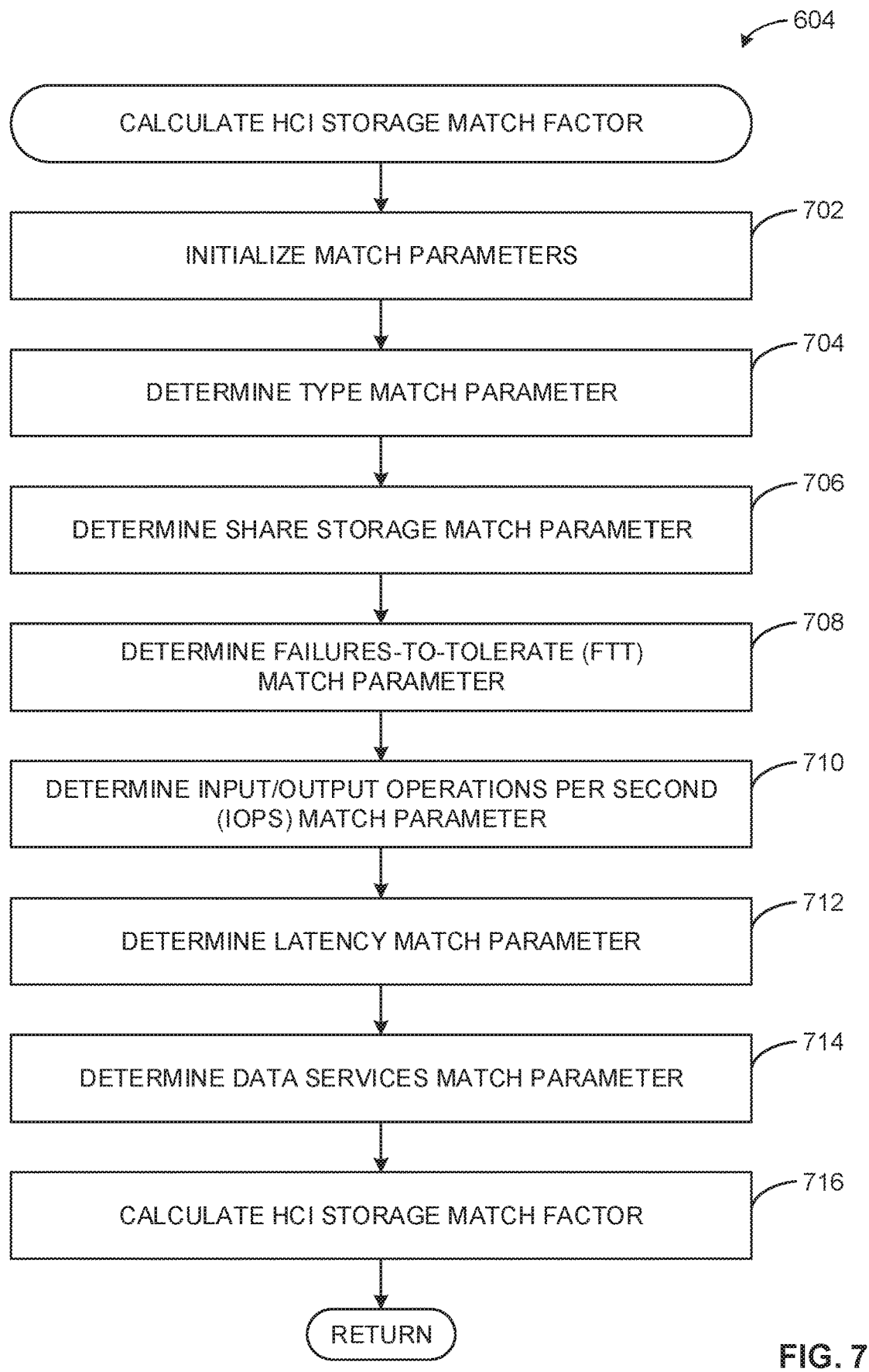

FIG. 7 is a flowchart representative of an example implementation of block 604 that may be performed by the example resource allocator 208 of FIGS. 2 and/or 3 to calculate an HCI storage match factor. The example implementation of block 604 begins at block 702, at which the example resource allocator 208 initializes match parameters. For example, the storage match determiner 320 may initialize one or more match parameters such as a share storage match parameter, a type match parameter, an FTT match parameter, an IOPS match parameter, a latency match parameter, a data services match parameter, etc.

At block 704, the example resource allocator 208 determines a type match parameter. For example, the storage match determiner 320 may determine that the QoS storage type parameter indicates a hybrid storage type. In such an example, the storage match determiner 320 may compare a storage type of each host in a host set to the hybrid storage type and calculate a value for the type match parameter based on a number of hosts in the host set matching the hybrid storage type. At block 706, the example resource allocator 208 determines a share storage match parameter. For example, the storage match determiner 320 may calculate a share storage match parameter based on the share storage parameter (e.g., a value of the share storage match parameter is set to a value of the share storage parameter).

At block 708, the example resource allocator 208 determines a failures-to-tolerate (FTT) match value. For example, the storage match determiner 320 may determine a storage configuration such as a RAID configuration based on the QoS RAID parameter. For example, the storage match determiner 320 may determine a quantity of hosts needed to execute the RAID configuration specified by the QoS RAID parameter. The example storage match determiner 320 may compare the number of hosts in the host set to the quantity of hosts specified by the QoS RAID parameter and determine whether the number of hosts is greater than or equal to the specified quantity of hosts based on the comparison.

At block 710, the example resource allocator 208 determines an input/output operations per second (IOPS) match parameter. For example, the storage match determiner 320 may calculate an IOPS value corresponding to each host in the host set. For example, the storage match determiner 320 may determine the IOPS match parameter based on determining a minimum value of the calculated IOPS values.

At block 712, the example resource allocator 208 determines a latency match parameter. For example, the storage match determiner 320 may calculate a latency value corresponding to each host in the host set. For example, the storage match determiner 320 may determine the latency match parameter based on determining a minimum value of the calculated latency values.

At block 714, the example resource allocator 208 determines a data services match parameter. For example, the storage match determiner 320 may determine one or more data services indicated by the QoS data services parameter. The example storage match determiner 320 may compare each data service included in the storage virtualizer 218 to the one or more data services indicated by the QoS data services parameter. The example storage match determiner 320 may determine the data services match parameter based on whether a data service of the storage virtualizer 218 does not match the one or more data services indicated by the QoS data services parameter.

At block 716, the example resource allocator 208 calculates an HCI storage match factor. For example, the storage match determiner 320 may calculate the HCI storage match factor based on a sum of the type match parameter, the share storage match parameter, the FTT match parameter, the IOPS match parameter, the latency match parameter, and the data services match parameter. In response to calculating the HCI storage match parameter, the example implementation of block 604 returns to block 606 of the example implementation of block 404 of FIG. 6 to determine whether the HCI storage match factor satisfies a threshold.

Figure 8:
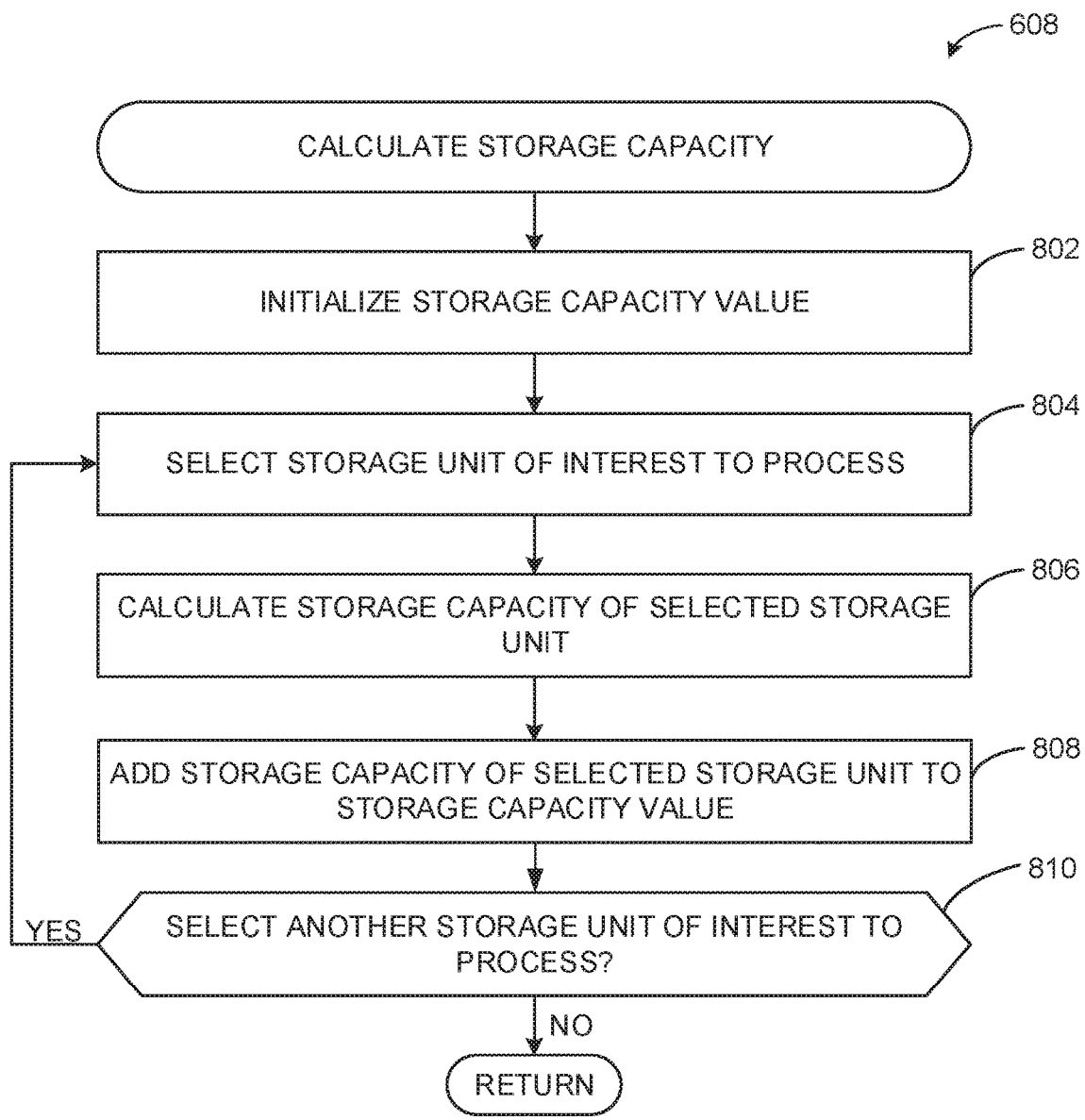

FIG. 8 is a flowchart representative of an example implementation of block 608 that may be performed by the example resource allocator 208 of FIGS. 2 and/or 3 to calculate a storage capacity. The example implementation of block 608 begins at block 802, at which the example resource allocator 208 initializes a storage capacity value. For example, the storage cost calculator 330 may initialize a storage capacity value to zero or any other baseline value of interest.

At block 804, the example resource allocator 208 selects a storage unit of interest to process. For example, the storage cost calculator 330 may select a first HCI host in a set of three HCI hosts to process. In another example, the storage cost calculator 330 may select a first external storage resource in a set of three external storage resources to process.

At block 806, the example resource allocator 208 calculates a storage capacity of the selected storage unit. For example, the storage cost calculator 330 may calculate a storage capacity (e.g., 100 GB, 500 GB, etc.) of the first HCI host in the set of three HCI hosts. In another example, the storage cost calculator 330 may calculate the storage capacity of the first external storage resource in the set of three external storage resources.

At block 808, the example resource allocator 208 adds the storage capacity of the selected storage unit to the storage capacity value. For example, the storage cost calculator 330 may add the storage capacity of the first HCI host in the set of three HCI hosts to a storage capacity value corresponding to the HCI host set. In another example, the storage cost calculator 330 may add the storage capacity of the first external storage resource in the set of three external storage resources to a storage capacity value corresponding to the external storage resource set.

At block 810, the example resource allocator 208 determines whether to select another storage unit of interest to process. For example, the storage cost calculator 330 may select a second HCI host in the set of three HCI hosts to process. In another example, the storage cost calculator 330 may select a second external storage resource in the set of three external storage resources to process. In yet another example, the storage cost calculator 330 may determine that all storage units of interest in a storage set have been processed.

If, at block 810, the example resource allocator 208 determines to select another storage unit of interest to process, control returns to block 804 to select another storage unit of interest to process. If, at block 810, the example resource allocator 208 determines not to select another storage unit of interest to process, the example implementation of block 608 of returns to block 610 of the example implementation of block 404 of FIG. 6 to determine whether the storage capacity satisfies a threshold.

Figure 9:
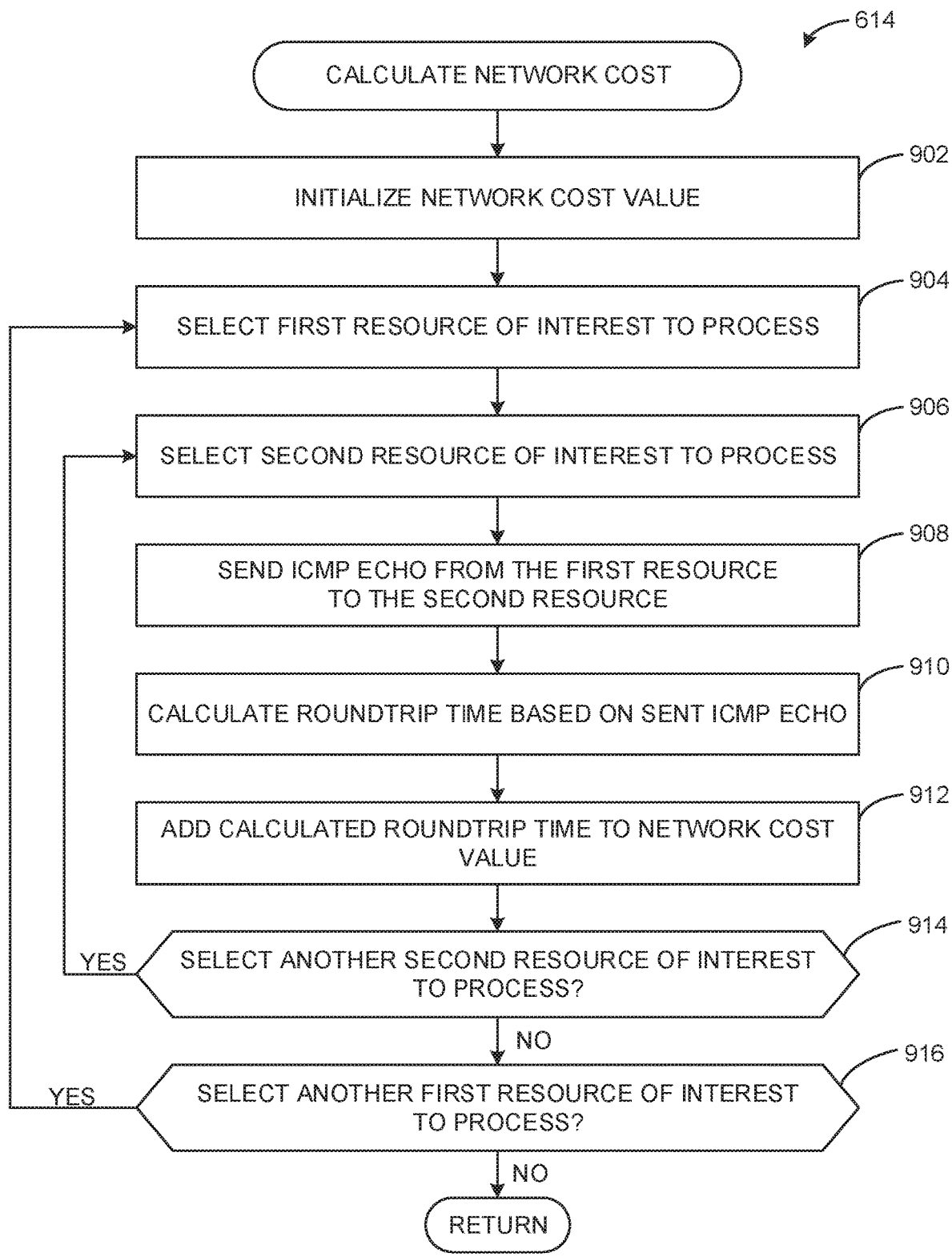

FIG. 9 is a flowchart representative of an example implementation of block 614 that may be performed by the example resource allocator 208 of FIGS. 2 and/or 3 to calculate a network cost. The example implementation of block 614 begins at block 902, at which the example resource allocator 208 initializes a network cost value. For example, the network cost calculator 340 may initialize a network cost value to zero or any other baseline value of interest.

At block 904, the example resource allocator 208 selects a first resource of interest to process. For example, the network cost calculator 340 may select a first HCI host in a set of five HCI hosts to process. In another example, the network cost calculator 340 may select a first external storage resource in a set of three external storage resources to process.

At block 906, the example resource allocator 208 selects a second resource of interest to process. For example, the network cost calculator 340 may select a second HCI host in the set of five HCI hosts to process. In another example, the network cost calculator 340 may select a first HCI host in a set of three HCI hosts corresponding to the set of three external storage resources to process.

At block 908, the example resource allocator 208 sends an ICMP echo from the first resource to the second resource. For example, the network cost calculator 340 may send an ICMP echo from the first HCI host to the second HCI host. In another example, the network cost calculator 340 may send an ICMP echo (e.g., an ICMP echo data packet) from the first HCI host to the first external storage resource.

At block 910, the example resource allocator 208 calculates a roundtrip time based on the sent ICMP echo. For example, the network cost calculator 340 may calculate a roundtrip time based on (1) a first time at which the network cost calculator 340 directed the ICMP echo to be sent from the first HCI host to the second HCI host and (2) a second time at which the network cost calculator 340 observes the first HCI host obtaining the ICMP echo reply (e.g., the ICMP echo reply data packet). For example, the network cost calculator 340 may calculate the roundtrip time based on calculating a difference between the first and the second times. In another example, the network cost calculator 340 may calculate a roundtrip time based on (1) a third time at which the network cost calculator 340 directed the ICMP echo to be sent from the first HCI host to the first external storage resource and (2) a fourth time at which the network cost calculator 340 observes the first HCI host obtaining the ICMP echo reply (e.g., the ICMP echo reply data packet).

At block 912, the example resource allocator 208 adds the calculated roundtrip time to a network cost value. For example, the network cost calculator 340 may add the calculated roundtrip time based on the first and the second times as described above to the network cost value corresponding to the set of five HCI hosts. In another example, the network cost calculator 340 may add the calculated roundtrip time based on the third and the fourth times as described above to the network cost value corresponding to the set of three HCI hosts and the set of three external storage resources.

At block 914, the example resource allocator 208 determines whether to select another second resource of interest to process. For example, the network cost calculator 340 may select a third host in the set of five HCI hosts to process. In another example, the network cost calculator 340 may select a second external storage resource in the set of three external storage resources to process.

If, at block 914, the example resource allocator 208 determines to select another second resource of interest to process, control returns to block 906 to select another second resource of interest to process. If, at block 914, the example resource allocator 208 determines not to select another second resource of interest to process, then, at block 916, the resource allocator 208 determines to select another first resource of interest to process. For example, the network cost calculator 340 may continue to select the first host in the set of five HCI hosts to process or another host such as the second host in the set of five HCI hosts to process. In another example, the network cost calculator 340 may continue to select the first external storage resource in the set of three external storage resources to process or another external storage resource such as the third external storage resource in the set of three external storage resources to process.

If, at block 916, the example resource allocator 208 determines to select another first resource of interest to process, control returns to block 904 to select another first resource of interest to process. If, at block 916, the example resource allocator 208 determines not to select another first resource of interest to process, the example implementation of block 614 returns to block 616 of the example implementation of block 404 of FIG. 6 to calculate a resource allocation cost.

Figure 10:
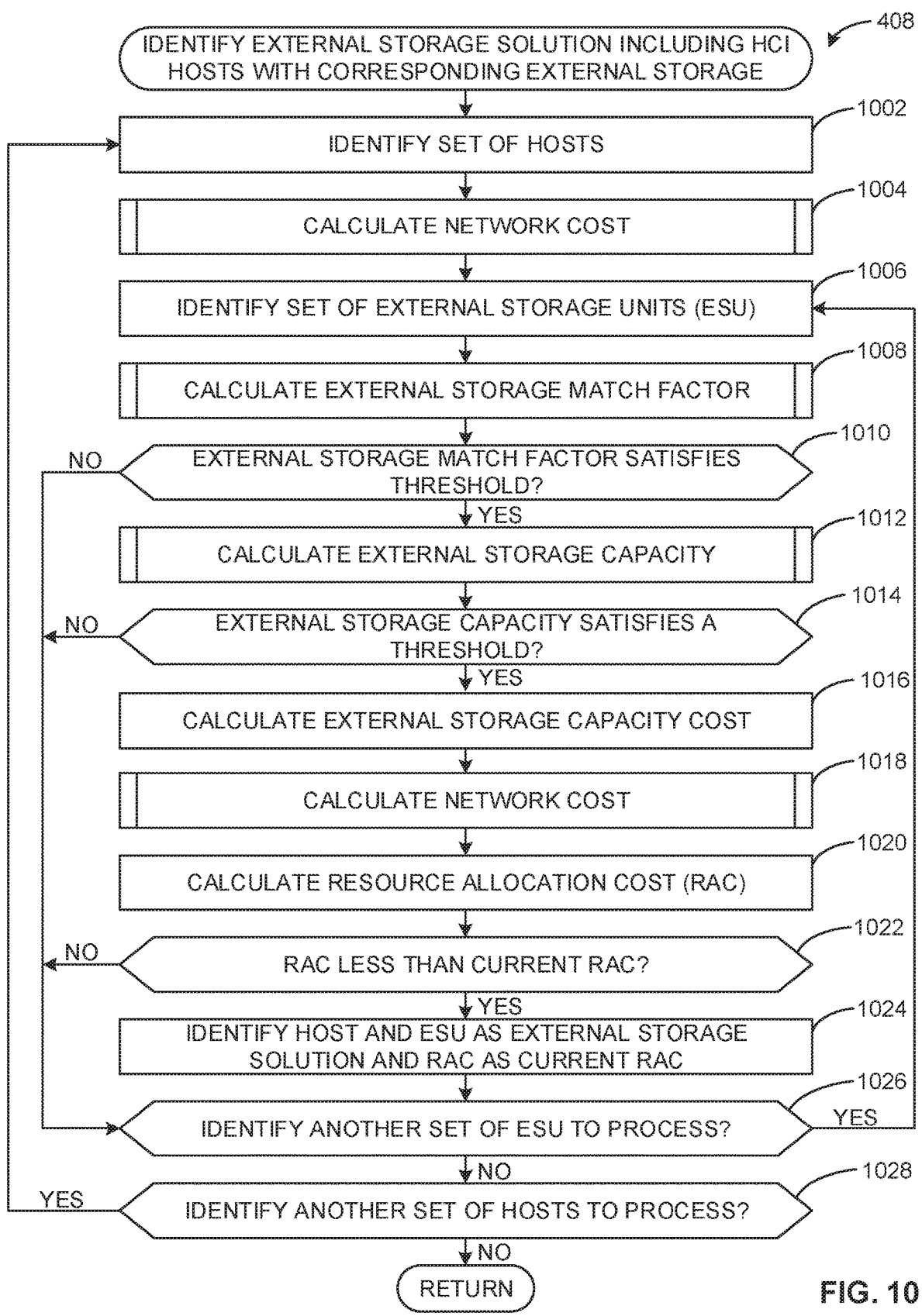

FIG. 10 is a flowchart representative of an example implementation of block 408 that may be performed by the example resource allocator 208 of FIGS. 2 and/or 3 to identify an external storage solution including HCI hosts with corresponding HCI external storage. The example implementation of block 408 begins at block 1002, at which the example resource allocator 208 identifies a set of hosts. For example, the resource identifier 310 may identify three HCI hosts with corresponding HCI storage to process. In such an example, the resource identifier 310 may identify the three HCI hosts based on the parameter determiner 300 determining that three hosts are needed to generate a workload domain based on one or more requirements.

At block 1004, the example resource allocator 208 calculates a network cost. For example, the network cost calculator 340 may calculate a network cost corresponding to the identified three hosts. An example process that may be used to implement block 1004 is described above in connection with FIG. 9.

At block 1006, the example resource allocator 208 identifies a set of external storage units. For example, the resource identifier 310 may identify a set of three external storage resources. At block 1008, the example resource allocator 208 calculates an external storage match factor. For example, the storage match determiner 320 may calculate an external storage match factor corresponding to the set of three external storage resources. An example process that may be used to implement block 1008 is described below in connection with FIG. 11.

At block 1010, the example resource allocator 208 determines whether the external storage match factor satisfies a threshold. For example, the storage match determiner 320 may compare the external storage match factor to an external storage match factor threshold and determine that the external storage match factor threshold has been satisfied based on the comparison. For example, the storage match determiner 320 may determine that the external storage match factor threshold has been satisfied based on determining that the external storage match factor is greater than the external storage match factor threshold.

If, at block 1010, the example resource allocator 208 determines that the external storage match factor does not satisfy the threshold, control proceeds to block 1026 to determine whether to identify another set of external storage units. If, at block 1010, the example resource allocator 208 determines that the external storage match factor does satisfy the threshold, then, at block 1012, the resource allocator 208 calculates an external storage capacity. For example, the storage cost calculator 330 may calculate a storage capacity (e.g., a total storage capacity) of the set of three external storage resources. An example process that may be used to implement block 1012 is described above in connection with FIG. 8.

At block 1014, the example resource allocator 208 determines whether the external storage capacity satisfies a threshold. For example, the storage cost calculator 330 may compare the external storage capacity to an external storage capacity threshold and determine that the external storage capacity threshold has been satisfied based on the comparison. For example, the storage cost calculator 330 may determine that the external storage capacity threshold has been satisfied based on determining that the external storage capacity of the storage included in the set of three external storage resources is greater than the external storage capacity threshold.

If, at block 1014, the example resource allocator 208 determines that the external storage capacity does not satisfy the threshold, control proceeds to block 1026 to determine whether to identify another set of external storage units. If, at block 1014, the example resource allocator 208 determines that the external storage capacity satisfies the threshold, then, at block 1016, the resource allocator 208 calculates an external storage capacity cost. For example, the storage cost calculator 330 may calculate an external storage capacity cost corresponding to the storage capacity of the storage included in the three external storage resources compared to the requested storage capacity for the workload domain.

At block 1018, the example resource allocator 208 calculates a network cost. For example, the network cost calculator 340 may calculate an external storage network cost associated with the three HCI hosts and the corresponding HCI storage and the set of three external storage resources. An example process that may be used to implement block 1018 is described above in connection with FIG. 9.

At block 1020, the example resource allocator 208 calculates a resource allocation cost. For example, the cost analyzer 350 may calculate a resource allocation cost associated with the three HCI hosts and the corresponding HCI storage and the set of three external storage resources. For example, the cost analyzer 350 may calculate the resource allocation cost based on the external storage match factor, the storage capacity cost, the network cost, the external storage network cost, etc., corresponding to the three HCI hosts and the corresponding HCI storage and the set of three external storage resources.

At block 1022, the example resource allocator 208 determines whether the resource allocation cost is less than a current resource allocation cost. For example, the cost analyzer 350 may compare (1) the resource allocation cost of the three HCI hosts and the corresponding HCI storage and the set of three external storage resources to (2) the current resource allocation cost corresponding to a baseline cost or a calculated resource allocation cost associated with a previously identified set of hosts and corresponding external storage.

If, at block 1022, the example resource allocator 208 determines that the resource allocation cost is greater than the current resource allocation cost, control proceeds to block 1026 to determine whether to identify another set of external storage units. If, at block 1022, the example resource allocator 208 determines that the resource allocation cost is less than the current resource allocation cost, then, at block 1024, the resource allocator 208 identifies the set of hosts and the external storage units as an external storage solution and identifies the associated resource allocation cost as the current resource allocation cost. For example, in response to determining that the resource allocation cost is less than the current resource allocation cost, the cost analyzer 350 may identify the three HCI host with the corresponding HCI storage and the set of three external storage resources as the external storage solution to be allocated to the workload domain if no further host sets and/or external storage sets are to be processed.

At block 1026, the example resource allocator 208 determines whether to identify another set of external storage units to process. For example, the resource identifier 310 may identify another set of three external storage resources to process. If, at block 1026, the example resource allocator 208 determines to identify another set of external storage units to process, control returns to block 1006 to identify another set of external storage units. If, at block 1026, the example resource allocator 208 determines not to identify another set of external storage units to process, then, at block 1028, the resource allocator 208 determines to identify another set of hosts to process. For example, the resource identifier 310 may identify another set of three HCI hosts with corresponding HCI storage to process.

If, at block 1028, the example resource allocator 208 determines to identify another set of hosts to process, control returns to block 1002 to identify another set of hosts. If, at block 1028, the example resource allocator 208 determines not to identify another set of hosts to process, then the example implementation of block 408 returns to block 410 of the example method 400 of FIG. 4 to determine whether an external storage solution has been identified.

Figure 11:
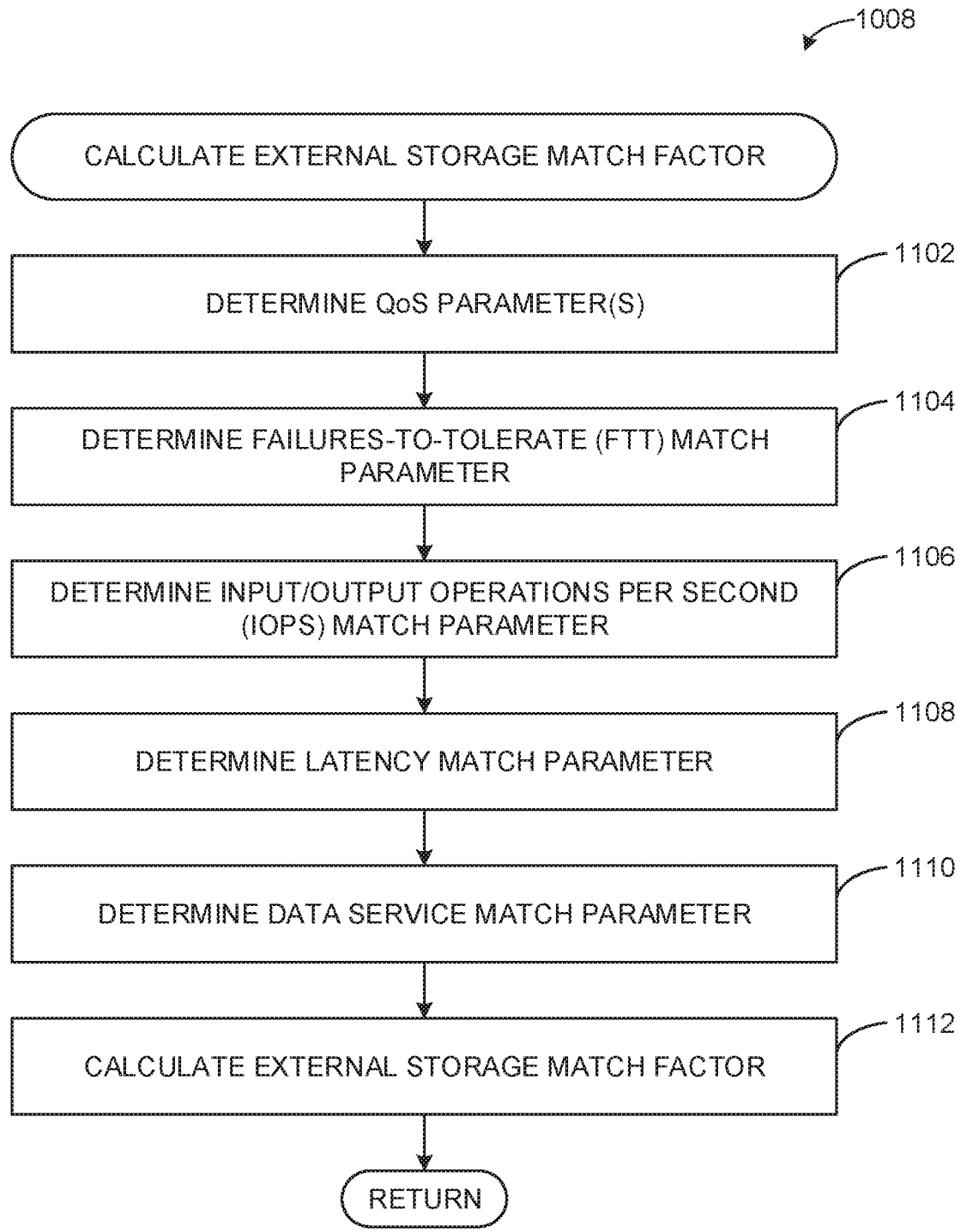

FIG. 11 is a flowchart representative of an example implementation of block 1008 that may be performed by the example resource allocator 208 of FIGS. 2 and/or 3 to calculate an external storage match factor. The example implementation of block 1008 of FIG. 11 begins at block 1102, at which the example resource allocator 208 determines QoS parameter(s). For example, the parameter determiner 300 may determine one or more QoS parameters such as a QoS RAID parameter, a QoS IOPS parameter, a QoS latency parameter, a QoS data services parameter, etc.

At block 1104, the example resource allocator 208 determines a failures-to-tolerate (FTT) match parameter. For example, the storage match determiner 320 may determine a storage configuration such as a RAID configuration based on the QoS RAID parameter. For example, the storage match determiner 320 may determine a quantity of storage resources needed to execute the RAID configuration specified by the QoS RAID parameter. The example storage match determiner 320 may compare the number of storage resources in the external storage resource set to the quantity of storage resources specified by the QoS RAID parameter and determine whether the number of external storage resources is greater than or equal to the specified quantity of storage resources based on the comparison.

At block 1106, the example resource allocator 208 determines an input/output operations per second (IOPS) match parameter. For example, the storage match determiner 320 may calculate an IOPS value for each storage resource in the external storage resource set. For example, the storage match determiner 320 may determine the IOPS match parameter based on determining a minimum value of the calculated IOPS values.

At block 1108, the example resource allocator 208 determines a latency match parameter. For example, the storage match determiner 320 may calculate a latency value for each storage resource in the external storage resource set. For example, the storage match determiner 320 may determine the latency match parameter based on determining a minimum value of the calculated latency values.

At block 1110, the example resource allocator 208 determines a data service match parameter. For example, the storage match determiner 320 may determine one or more data services indicated by the QoS data services parameter. The example storage match determiner 320 may compare each data service included in the storage virtualizer 218 corresponding to the external storage resource set to the one or more data services indicated by the QoS data services parameter. The example storage match determiner 320 may determine the data service match parameter based on whether a data service of the storage virtualizer 218 corresponding to the external storage resource set does not match the one or more data services indicated by the QoS data services parameter.

At block 1112, the example resource allocator 208 calculates an external storage match factor. For example, the storage match determiner 320 may calculate the external storage match factor based on a sum of the FTT match parameter, the IOPS match parameter, the latency match parameter, and the data services match parameter. In response to calculating the external storage match parameter, the example implementation of block 1008 returns to block 1010 of the example implementation of block 408 of FIG. 10 to determine whether the external storage match factor satisfies a threshold.

FIGS. 12A-12B depict example source code 1200 representative of example computer readable instructions that may be executed to implement the example resource allocator of FIGS. 2 and/or 3 that may be used to implement the examples disclosed herein. For example, the source code 1200 may be used to implement the processes of FIGS. 4-6, 8, 9, and/or 10.

In the illustrated example of FIG. 12A, the resource allocator 208 initializes parameters such as a lowest cost set (e.g., a current HCI host set, a current HCI host solution, etc.), a lowest cost external storage set (e.g., a current external storage resource set, a current external storage solution, etc.), a lowest cost (e.g., a current cost, a baseline cost, etc.), etc. In the illustrated example, the resource allocator 208 obtains a set of hosts including zero, one, or more hosts available to be allocated to a workload domain.

In the illustrated example, the resource allocator 208 obtains a set of external storage resources including zero, one, or more external storage resources available to be allocated to a workload domain.

In the illustrated example of FIG. 12A, the resource allocator 208 determines a total quantity of hosts needed to create a workload domain, one or more storage QoS parameter(s), a storage capacity, a storage buffer parameter, and a share storage factor. In the illustrated example, the resource allocator 208 obtains a set of hosts (e.g., a set of HCI hosts with corresponding HCI storage) while the set of hosts is not empty (e.g., there are sets of HCI hosts that have not been processed). In the illustrated example, the resource allocator 208 calculates an HCI storage match factor based on the obtained set of hosts, the one or more QoS parameters, and the share storage parameter. For example, the storage match determiner 320 may calculate the HCI storage match factor by executing source code 1300 depicted below in accordance below with FIG. 13. In response to calculating the HCI storage match factor, the example resource allocator 208 compares the HCI storage match factor to a threshold of 0. In response to the example resource allocator 208 determining that the HCI storage match factor does not satisfy the HCI storage match factor threshold by being greater than 0, the example source code 1200 continues to obtain another set of hosts (e.g., obtain another set of host when there is an additional set of host to obtain).

In the illustrated example of FIG. 12A, in response to determining that the HCI storage match factor satisfies the HCI storage match threshold by being greater than the HCI storage match threshold, the resource allocator 208 calculates a storage capacity. In the illustrated example, the resource allocator 208 calculates a storage capacity of each HCI host in the HCI host set and adds the calculated storage capacity to a storage capacity corresponding to the HCI host set.

In the illustrated example of FIG. 12A, in response to calculating the storage capacity, the resource allocator 208 compares the storage capacity to a storage capacity threshold. If the example resource allocator 208 determines that the storage capacity does not satisfy the storage capacity threshold based on the storage capacity being less than the storage capacity threshold, the resource allocator 208 continues to identify another set of hosts. If the example resource allocator 208 determines that the storage capacity does satisfy the storage capacity threshold based on the storage capacity being greater than the storage capacity threshold, the resource allocator 208 calculates a storage capacity cost. In the illustrated example, the resource allocator 208 calculates the storage capacity cost based on the storage capacity, the storage capacity needed for the workload domain, and the storage buffer parameter.

In the illustrated example of FIG. 12A, the resource allocator 208 calculates a network cost. For example, the network cost calculator 340 may calculate a total network cost based on calculating roundtrip times of data packets sent between pairs of hosts in the HCI host set. In the illustrated example, the resource allocator 208 calculates a cost (e.g., a resource allocation cost) based on the network cost, the HCI storage match factor, and the storage capacity cost. In response to calculating the cost, the example resource allocator 208 determines whether the cost is less than a lowest cost (e.g., a current cost, a current resource allocation cost, a baseline cost, etc.). If the example resource allocator 208 determines that the cost is greater than the lowest cost, the resource allocator 208 continues to identify another set of HCI hosts. If the example resource allocator 208 determines that the cost is less than the lowest cost, the resource allocator 208 sets the cost as the lowest cost and sets the identified host set as the lowest cost set.

In the illustrated example of FIG. 12B, the resource allocator 208 determines whether an HCI storage solution has been identified. For example, the cost analyzer 350 may compare the lowest cost to a lowest cost threshold (e.g., MAX_INT). For example, the cost analyzer 350 may determine that an HCI storage solution has not been identified when the lowest cost is equal to a pre-determined value, a baseline value, etc.

In the illustrated example of FIG. 12B, the resource allocator 208 attempts to identify an external storage solution when an HCI storage solution is not identified. For example, the resource identifier 310 may identify a set of HCI hosts to process. In the illustrated example, the resource allocator 208 initializes a network cost to zero and determines the network cost based on calculating a sum of network costs between pairs of hosts in the HCI host set.

In the illustrated example of FIG. 12B, the resource allocator 208 identifies a set of external storage resources (denoted by S) when the set of external storage resources is not empty (e.g., there are sets of external storage resources that have not been processed). In the illustrated example, the resource allocator 208 calculates an external storage match factor based on the identified set of external storage resources and the one or more storage QoS parameters. For example, the storage match determiner 320 may calculate the external storage match factor by executing source code 1400 depicted below in accordance below with FIG. 14. In response to calculating the external storage match factor, the example resource allocator 208 compares the external storage match factor to an external storage match factor threshold, which in this example source code 1200 is 0. For example, the storage match determiner 320 may determine to continue to identify another set of external storage resources in response to determining that the external storage match factor does not satisfy the storage match factor threshold by being greater than 0.

In the illustrated example of FIG. 12B, the resource allocator 208 determines to calculate a storage capacity of the identified external storage resource set in response to determining that the external storage match factor satisfies the external storage match threshold. In response to calculating the storage capacity, the example resource allocator 208 compares the storage capacity to a storage capacity threshold (e.g., storage capacity threshold=C*(1+CG)). In the illustrated example, if the storage capacity is less than the storage capacity threshold, the resource allocator 208 continues to identify another set of external storage resources. If the storage capacity is greater than the storage capacity threshold, the example resource allocator 208 calculates a storage capacity cost based on the storage capacity of the external storage resource set, the storage capacity needed to generate the workload domain, and the storage buffer parameter. In response to calculating the storage capacity cost, the example resource allocator 208 calculates a storage network cost. For example, the network cost calculator 340 may calculate a network cost associated with an HCI host set and corresponding HCI storage and the external storage resource set. An example process that may be used to calculate the network cost is described above in connection with FIG. 9.

In the illustrated example of FIG. 12B, the resource allocator 208 calculates a cost (e.g., a resource allocation cost) based on the network cost, the external storage match factor, the storage capacity cost, and the storage network cost. In the illustrated example, the resource allocator 208 compares the cost to a lowest cost threshold (e.g., a current cost, a baseline cost, etc.). If the cost is greater than the lowest cost threshold, the example resource allocator 208 continues to identify another HCI host set and/or an external storage resource set. If the cost is less than the lowest cost threshold, the example resource allocator 208 sets the cost associated with the identified external storage resource set as the lowest cost threshold, the HCI host set as the lowest cost set, and the external storage resource set as the lowest cost external storage set. The example source code 1200 of FIGS. 12A-12B is repeated until there are no remaining HCI host sets (e.g., HCI host set combinations) nor external storage resource sets (e.g., external storage resource combinations) to process. In response to determining a lowest cost set such as an HCI host solution, an external storage solution, etc., the example resource allocator 208 allocates the lowest cost set to the workload domain.

FIG. 13 depicts example source code representative of example computer readable instructions that may be executed to implement the storage match determiner 320 of FIG. 3 and/or, more generally, the example resource allocator of FIGS. 2 and/or 3 that may be used to calculate an HCI storage match factor. In the illustrated example, the resource allocator 208 initializes storage match parameters such as a share storage match parameter (XMatch), an FTT match parameter (FTTMatch), an IOPS match parameter (IOPSMatch), a latency match parameter (LatencyMatch), a data services match parameter (DataServicesMatch), and a type match parameter (TypeMatch).

In the illustrated example of FIG. 13, the resource allocator 208 calculates a type match parameter based on comparing a storage type of host in an HCI host set to a storage type indicated by the QoS storage type parameter. In the illustrated example, the resource allocator 208 calculates the share storage match parameter based on the share storage parameter. In the illustrated example, the resource allocator 208 calculates the FTT match parameter by comparing a quantity of hosts in the HCI host set to a RAID configuration specified by the QoS RAID parameter.

In the illustrated example of FIG. 13, the resource allocator 208 calculates the IOPS match parameter by calculating a minimum IOPS value based on calculating an IOPS value for each host in the HCI host set. In the illustrated example, the resource allocator 208 calculates the latency match parameter by calculating a minimum latency value based on calculating a latency value for each host in the HCI host set. In the illustrated example, the resource allocator 208 calculates the data services match parameter by comparing the data services of the storage virtualizer 218 of FIG. 2 to the data services included in the QoS data services parameter. In the illustrated example, the resource allocator 208 calculates the HCI storage match factor (MatchFactor) by calculating a sum of the storage type match parameter, the share storage match parameter, the FTT match parameter, the IOPS match parameter, the latency match parameter, and the data services match parameter. In response to calculating the HCI storage match factor, the example resource allocator 208 returns to the example source code 1200 of FIGS. 12A-12B.

FIG. 14 depicts example source code 1400 representative of example computer readable instructions that may be executed to implement the example storage match determiner 320 and/or, more generally, the example resource allocator of FIGS. 2 and/or 3 that may be used to calculate an external storage match factor. In the illustrated example, the resource allocator 208 initializes storage match parameters such as an FTT match parameter (FTTMatch), an IOPS match parameter (IOPSMatch), a latency match parameter (LatencyMatch), and a data services match parameter (DataServicesMatch).

In the illustrated example of FIG. 14, the resource allocator 208 calculates the FTT match parameter by comparing a quantity of hosts in the external storage set (S) to a RAID configuration (RAIDlevel) specified by the QoS RAID parameter. In the illustrated example, the resource allocator 208 calculates the IOPS match parameter by calculating an IOPS value corresponding to the external storage resource set. In the illustrated example, the resource allocator 208 calculates the latency match parameter by calculating a latency value corresponding to the HCI host set. In the illustrated example, the resource allocator 208 calculates the data services match parameter by comparing the data services included in the external storage resource set to the data services included in the QoS data services parameter. In the illustrated example, the resource allocator 208 calculates the external storage match factor (ExternalMatchFactor) by calculating a sum of the FTT match parameter, the IOPS match parameter, the latency match parameter, and the data services match parameter. In response to calculating the external storage match factor, the example resource allocator 208 returns to the example source code 1200 of FIGS. 12A-12B.

Figure 15:
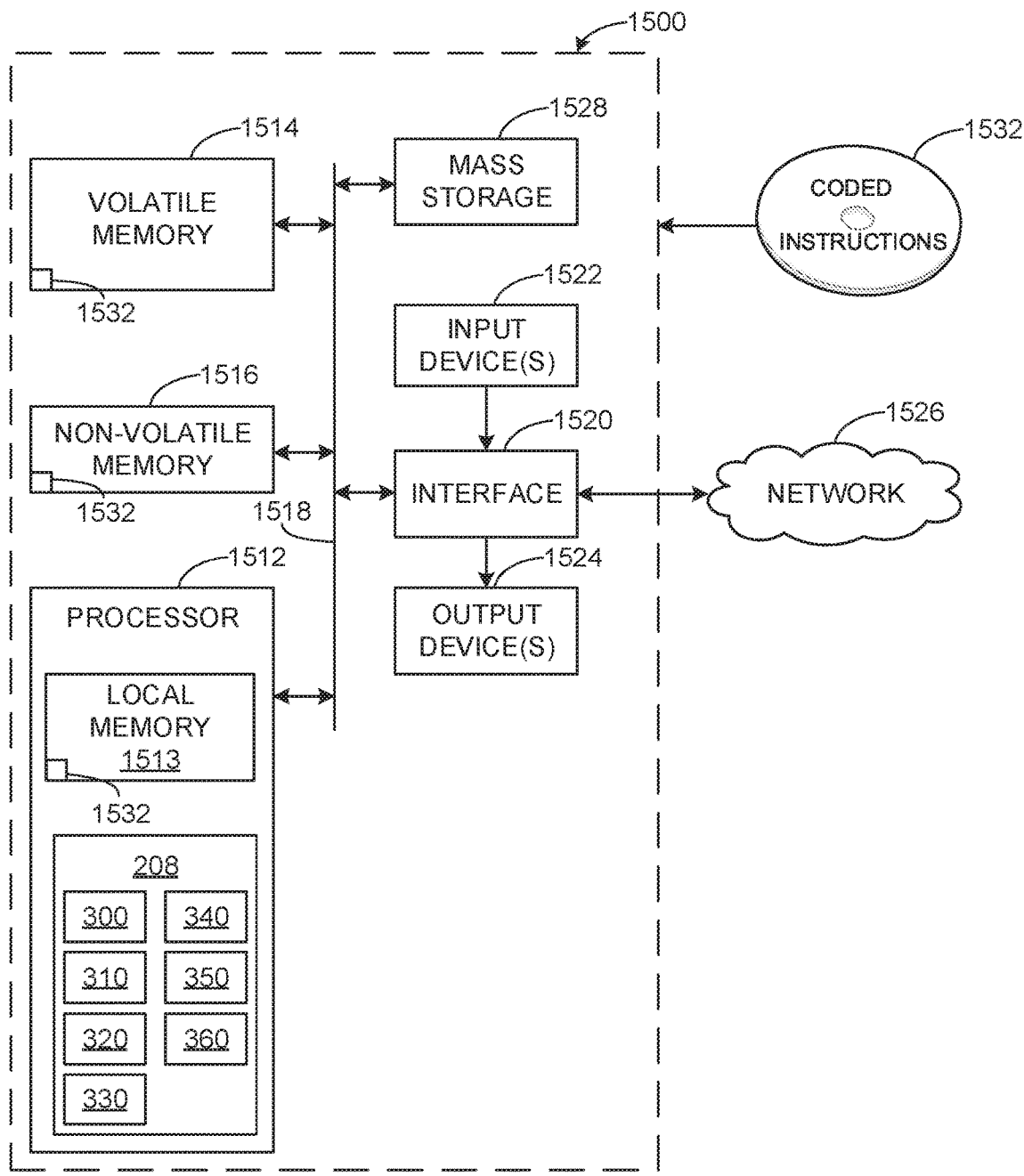
FIG. 15 is a block diagram of an example processing platform structured to execute the machine readable instructions of FIGS. 4-14 to implement the example resource allocator of FIGS. 2 and/or 3.

FIG. 15 is a block diagram of an example processor platform 1500 capable of executing the instructions of FIGS. 4-14 to implement the resource allocator 208 of FIGS. 2 and/or 3. The processor platform 1500 can be, for example, a rack-mount server or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. The hardware processor may be a semiconductor based (e.g., silicon based) device. In this example, the processor 1512 implements the example parameter determiner 300, the example resource identifier 310, the example storage match determiner 320, the example storage cost calculator 330, the example network cost calculator 340, the example cost analyzer 350, the example workload domain allocator 360, and/or, more generally, the example resource allocator 208.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a peripheral component interconnect (PCI) express interface.

In the illustrated example, one or more input devices 1522 are connected to the interface circuit 1520. The input device (s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuit 1520 of the illustrated example. The output devices 1524 can be implemented, for example, by display devices (e.g., a light emitting diode(LED), an organic light emitting diode(OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip, and/or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and DVD drives.

The coded instructions 1532 of FIGS. 4-14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus, and articles of manufacture have been disclosed that improve resource allocation for virtualized computer server systems. Examples described herein include identifying a storage solution based on availability, capacity, performance, etc., requirements compared to prior examples that identified storage solutions based on identifying a first set of available resources. Examples described herein improve performance and efficiencies of network communications among different virtual and/or physical resources of hardware resources allocated to a workload domain by identifying storage solutions to minimize latency. Examples described herein improve storage capacity management by identifying storage solutions that reduce storage capacity overhead and reduce unutilized storage capacity resources. Examples described herein improve host allocation management by identifying storage solutions that reduce a quantity of hosts needed to be allocated to a workload domain by determining a quantity of host based on storage buffer parameters and other requirements.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   at least one processor to execute instructions to improve network communications associated with a virtual server rack, the at least one processor to:
   identify a set of hyper-converged infrastructure (HCI) storage resources associated with the virtual server rack that executes a workload domain;
   identify a set of external storage resources in response to determining a first latency between the virtual server rack and an HCI storage resource of the set of the HCI storage resources exceeding a latency match parameter;
   calculate a storage capacity cost for ones of external storage resources in the external storage resource set based on a comparison of storage capacity of the ones of the external storage resources and a storage requirement of the workload domain;
   calculate second latencies between the virtual server rack and the ones of the external storage resources in the external storage resource set;
   determine whether a storage capacity cost threshold is satisfied based on the storage capacity cost and a storage network cost threshold is satisfied based on the second latencies;
   identify a first external storage resource from the external storage resource set as a storage solution; and
   allocate the first external storage resource to the workload domain.

2. The apparatus of claim 1, wherein the at least one processor is to:
   determine a quantity of hosts requested for the workload domain;
   identify a set of hosts based on the quantity of hosts;
   calculate a storage match factor corresponding to the set of hosts;
   compare the storage match factor to a storage match factor threshold; and
   determine whether the storage match factor satisfies the storage match factor threshold based on the comparison.

3. The apparatus of claim 2, wherein the at least one processor is to calculate the storage match factor by determining at least one of a type match parameter, a share storage match parameter, a failures-to-tolerate match parameter, an input/output operations per second match parameter, the latency match parameter, or a data services match parameter.

4. The apparatus of claim 2, wherein the at least one processor is to:
   calculate a host storage capacity of the host set based on calculating a storage capacity of ones of hosts in the host set in response to the storage match factor satisfying the storage match factor threshold;
   compare the host storage capacity to a storage capacity threshold;
   determine whether the host storage capacity satisfies the storage capacity threshold based on the comparison; and
   calculate a host network cost in response to the host storage capacity satisfying the storage capacity threshold.

5. The apparatus of claim 4, wherein the at least one processor is to:
   select a first host and a second host of the ones of the hosts in the host set;
   transmit a data packet from the first host to the second host at a first time;
   receive a reply data packet from the second host at the first host at a second time; and
   determine a roundtrip time based on a difference between the first time and the second time.

6. The apparatus of claim 1, wherein the at least one processor is to:
calculate an external storage match factor corresponding to the external storage resource set;
compare the external storage match factor to an external storage match factor threshold; and
determine whether the external storage match factor satisfies the external storage match factor threshold based on the comparison, the storage capacity cost calculated in response to the external storage match factor satisfying the external storage match factor threshold.

7. The apparatus of claim 6, wherein the at least one processor is to:
compare the storage capacity cost to the storage capacity cost threshold;
determine whether the storage capacity cost satisfies the storage capacity cost threshold based on the comparison; and
calculate a storage network cost in response to the storage capacity cost satisfying the storage capacity cost threshold, the storage network cost based on the second latencies.

8. A non-transitory computer readable storage medium comprising instructions which, when executed, cause a machine to improve network communications associated with a virtual server rack, the machine to at least:
identify a set of hyper-converged infrastructure (HCI) storage resources associated with the virtual server rack that executes a workload domain;
identify a set of external storage resources in response to determining a first latency between the virtual server rack and an HCI storage resource of the set of the HCI storage resources exceeding a latency match parameter;
calculate a storage capacity cost for ones of external storage resources in the external storage resource set based on a comparison of storage capacity of the ones of the external storage resources and a storage requirement of the workload domain;
calculate second latencies between the virtual server rack and the ones of the external storage resources in the external storage resource set;
determine whether a storage capacity cost threshold is satisfied based on the storage capacity cost and a storage network cost threshold is satisfied based on the second latencies;
identify a first external storage resource from the external storage resource set as a storage solution; and
allocate the first external storage resource to the workload domain.

9. The non-transitory computer readable storage medium of claim 8, wherein the instructions, when executed, cause the machine to at least:
determine a quantity of hosts requested for the workload domain;
identify a set of hosts based on the quantity of hosts;
calculate a storage match factor corresponding to the set of hosts;
compare the storage match factor to a storage match factor threshold; and
determine whether the storage match factor satisfies the storage match factor threshold based on the comparison.

10. The non-transitory computer readable storage medium of claim 9, wherein the instructions, when executed, cause the machine to at least determine at least one of a type match parameter, a share storage match parameter, a failures-to-tolerate (FTT) match parameter, an input/output operations per second match parameter, the latency match parameter, or a data services match parameter.

11. The non-transitory computer readable storage medium of claim 9, wherein the instructions, when executed, cause the machine to at least:
in response to determining that the storage match factor satisfies the storage match factor threshold, calculate a host storage capacity of the host set based on calculating a storage capacity of ones of hosts in the host set;
compare the host storage capacity to a storage capacity threshold;
determining whether the host storage capacity satisfies the storage capacity threshold based on the comparison; and
in response to determining that the host storage capacity satisfies the storage capacity threshold, calculate a host network cost.

12. The non-transitory computer readable storage medium of claim 11, wherein the instructions, when executed, cause the machine to at least:
select a first host and a second host of the ones of the hosts in the host set;
transmit a data packet from the first host to the second host at a first time;
receive a reply data packet from the second host at the first host at a second time; and
determine a roundtrip time based on a difference between the first time and the second time.

13. The non-transitory computer readable storage medium of claim 8, wherein the instructions, when executed, cause the machine to at least:
calculate an external storage match factor corresponding to the external storage resource set;
compare the external storage match factor to an external storage match factor threshold; and
determine whether the external storage match factor satisfies the external storage match factor threshold based on the comparison, the storage capacity cost calculated in response to determining that the external storage match factor threshold has been satisfied.

14. The non-transitory computer readable storage medium of claim 13, wherein the instructions, when executed, cause the machine to at least:
compare the storage capacity cost to the storage capacity cost threshold;
determine whether the storage capacity cost satisfies the storage capacity cost threshold based on the comparison; and
in response to determining that the storage capacity cost satisfies the storage capacity cost threshold, calculate a storage network cost based on the second latencies.

15. A method to improve network communications associated with a virtual server rack, the method comprising:
identifying a set of hyper-converged infrastructure (HCI) storage resources associated with the virtual server rack that executes a workload domain;
in response to determining a first latency between the virtual server rack and an HCI storage resource of the set of the HCI storage resources, identifying a set of external storage resources;
calculating a storage capacity cost for ones of external storage resources in the external storage resource set based on a comparison of storage capacity of the ones of the external storage resources and a storage requirement of the workload domain;

calculating second latencies between the virtual server rack and the ones of the external storage resources in the external storage resource set;

determining whether a storage capacity cost threshold is satisfied based on the storage capacity cost and a storage network cost threshold is satisfied based on the second latencies;

identifying a first external storage resource from the external storage resource set as a storage solution; and allocating the first external storage resource to the workload domain.

16. The method of claim 15, further including:

determining a quantity of hosts requested for the workload domain;

identifying a set of hosts based on the quantity of hosts;

calculating a storage match factor corresponding to the set of hosts;

comparing the storage match factor to a storage match factor threshold; and determining whether the storage match factor satisfies the storage match factor threshold based on the comparison.

17. The method of claim 16, wherein calculating the storage match factor includes determining at least one of a type match parameter, a share storage match parameter, a failures-to-tolerate (FTT) match parameter, an input/output operations per second match parameter, the latency match parameter, or a data services match parameter.

18. The method of claim 16, further including:

in response to determining that the storage match factor satisfies the storage match factor threshold, calculating a host storage capacity of the host set based on calculating a storage capacity of ones of hosts in the host set;

comparing the host storage capacity to a storage capacity threshold;

determining whether the host storage capacity satisfies the storage capacity threshold based on the comparison; and in response to determining that the host storage capacity satisfies the storage capacity threshold, calculating a host network cost.

19. The method of claim 18, wherein calculating the host network cost includes:

selecting a first host and a second host of the ones of the hosts in the host set;

transmitting a data packet from the first host to the second host at a first time;

receiving a reply data packet from the second host at the first host at a second time; and determining a roundtrip time based on a difference between the first time and the second time.

20. The method of claim 15, further including:

calculating an external storage match factor corresponding to the external storage resource set;

comparing the external storage match factor to an external storage match factor threshold; and determining whether the external storage match factor satisfies the external storage match factor threshold based on the comparison, the storage capacity cost calculated in response to the external storage match factor satisfying the external storage match factor threshold.

21. The method of claim 20, further including:

comparing the storage capacity cost to the storage capacity cost threshold;

determining whether the storage capacity cost satisfies the storage capacity cost threshold based on the comparison; and in response to determining that the storage capacity cost satisfies the storage capacity cost threshold, calculating a storage network cost based on the second latencies.

* * * * *